United States Patent
Phelps et al.

(10) Patent No.: US 6,913,167 B2
(45) Date of Patent: ***Jul. 5, 2005

(54) WINE OR CHAMPAGNE PRESERVATION AND DISPENSING APPARATUS

(75) Inventors: Johne Phelps, Ft. Myers, FL (US); Daniel N. O'Connor, Reno, NV (US); Robert R. Deller, Reno, NV (US); Justin R. Lydon, Queen Creek, AZ (US); Timothy C. McGuire, Reno, NV (US)

(73) Assignee: Vin Valet, Inc., Reno, NV (US)

( * ) Notice: Subject to any disclaimer, the term of this patent is extended or adjusted under 35 U.S.C. 154(b) by 73 days.

This patent is subject to a terminal disclaimer.

(21) Appl. No.: 10/462,415

(22) Filed: Jun. 16, 2003

(65) Prior Publication Data

US 2003/0213814 A1 Nov. 20, 2003

Related U.S. Application Data

(63) Continuation of application No. 09/996,332, filed on Nov. 26, 2001, now Pat. No. 6,607,100.

(51) Int. Cl.[7] .............................................. B67D 1/000
(52) U.S. Cl. ........................ 222/152; 222/190; 222/399
(58) Field of Search ................................ 222/152, 190, 222/399, 396, 397, 146.6

(56) References Cited

U.S. PATENT DOCUMENTS

| | | |
|---|---|---|
| 1,531,558 A | 3/1925 | Lehmann |
| 2,134,644 A | 10/1938 | Sadler |
| 3,139,219 A | 6/1964 | Gran |
| 3,195,779 A | 7/1965 | Nicko |
| 3,434,302 A | 3/1969 | Stoner et al. |
| 3,653,557 A | 4/1972 | Lamb |
| 3,754,408 A | 8/1973 | Littleton |
| 4,164,851 A | 8/1979 | Bryant |
| 4,436,227 A | 3/1984 | Johnson, Jr. et al. |
| 4,439,213 A | 3/1984 | Frey et al. |

(Continued)

OTHER PUBLICATIONS

Wine Preservation Systems published by wineaccessory.com (website) and printed on Apr. 11, 2001.
My Thoughts published by food4.epicurious.com (website) and printed on Apr. 11, 2001.
Wine Keeper®—How It Works published by www.winekeeper.com (website) and printed Jul. 11, 2001.
Vacu–Vin Vacuum Sealers published by wineaccessory.com (website) and printed Jul. 24, 2001.
The Wine Enthusiast® Catalog published by The Wine Enthusiast (not dated).
The Sharper Image Catalog Cover Page and p. 27 published by Sharper Image in Nov. 2001.

*Primary Examiner*—Gene Mancene
*Assistant Examiner*—Melvin A. Cartagena
(74) *Attorney, Agent, or Firm*—Bell, Boyd & Lloyd LLC

(57) ABSTRACT

An apparatus for preserving and dispensing wine or champagne. The apparatus provides a housing having a container support for holding wine or champagne bottles, a plurality of removable stoppers for insertion in the bottles, a nitrogen generator for generating a nitrogen rich gas from air, a nitrogen storage tank for storing the generated nitrogen rich gas, a cooling system for cooling certain bottles and dispensers for providing wine or champagne from the bottles to a user. The nitrogen generator draws in ambient air, adsorbs the oxygen from the air and stores nitrogen rich gas in the nitrogen storage tank. The nitrogen storage tank supplies the nitrogen rich gas to the bottles for preserving the wine or champagne. The stoppers include a nitrogen line and a supply line. The nitrogen line communicates nitrogen rich gas into the bottles and the supply line communicates wine or champagne from the bottles to the dispensers.

15 Claims, 21 Drawing Sheets

U.S. PATENT DOCUMENTS

| | | |
|---|---|---|
| 4,477,477 A | 10/1984 | Arter |
| 4,531,381 A | 7/1985 | Toro et al. |
| 4,541,251 A | 9/1985 | Louradour et al. |
| 4,572,723 A | 2/1986 | Ward |
| 4,595,121 A | 6/1986 | Schultz |
| 4,681,611 A | 7/1987 | Bohner |
| 4,691,842 A | 9/1987 | Foures |
| 4,706,847 A | 11/1987 | Sankey et al. |
| 4,753,268 A | 6/1988 | Palau |
| 4,829,774 A | 5/1989 | Wassibauer et al. |
| 4,856,680 A | 8/1989 | Sitton |
| 4,870,837 A | 10/1989 | Weins |
| 4,901,887 A | 2/1990 | Burton |
| 4,925,461 A | 5/1990 | Gemba et al. |
| 4,933,314 A | 6/1990 | Marumo et al. |
| 4,976,109 A | 12/1990 | Garrett |
| 4,982,736 A | 1/1991 | Schneider |
| 5,004,482 A | 4/1991 | Haas et al. |
| 5,139,179 A | 8/1992 | Cecil |
| 5,215,208 A | 6/1993 | Jackson |
| 5,228,888 A | 7/1993 | Gmelin et al. |
| 5,248,064 A | 9/1993 | Claycomb, Jr. |
| 5,275,640 A | 1/1994 | Schroter et al. |
| 5,343,712 A | 9/1994 | Gowan |
| 5,346,536 A | 9/1994 | Kaneshige et al. |
| 5,421,159 A | 6/1995 | Stokes |
| 5,429,664 A | 7/1995 | Lee |
| 5,441,558 A | 8/1995 | Lee et al. |
| 5,451,248 A | 9/1995 | Sadkowski et al. |
| 5,494,195 A | 2/1996 | Knuettel, II et al. |
| 5,505,765 A | 4/1996 | Kaji et al. |
| 5,515,693 A | 5/1996 | Cahill-O'Brien et al. |
| 5,540,355 A | 7/1996 | Hancock et al. |
| 5,582,028 A | 12/1996 | Rilling et al. |
| 5,626,353 A | 5/1997 | Campbell |
| 5,634,343 A | 6/1997 | Baker, III |
| 5,735,938 A | 4/1998 | Baksh et al. |
| 5,881,560 A | 3/1999 | Bielinski |
| 5,906,673 A | 5/1999 | Reinhold, III et al. |
| 5,906,674 A | 5/1999 | Tan et al. |
| 6,010,043 A * | 1/2000 | Williamson et al. ........ 222/608 |
| 6,026,988 A | 2/2000 | Teetsel, III et al. |
| 6,070,576 A | 6/2000 | Banucci et al. |
| 6,302,147 B1 | 10/2001 | Rose et al. |
| 6,370,883 B1 | 4/2002 | Kugel |
| 6,460,352 B1 | 10/2002 | Lemcoff et al. |
| 6,527,831 B2 | 3/2003 | Baksh et al. |
| 6,544,318 B2 | 4/2003 | Dee et al. |
| 6,560,974 B2 | 5/2003 | Kroll et al. |
| 2002/0033023 A1 | 3/2002 | Kroll et al. |

* cited by examiner

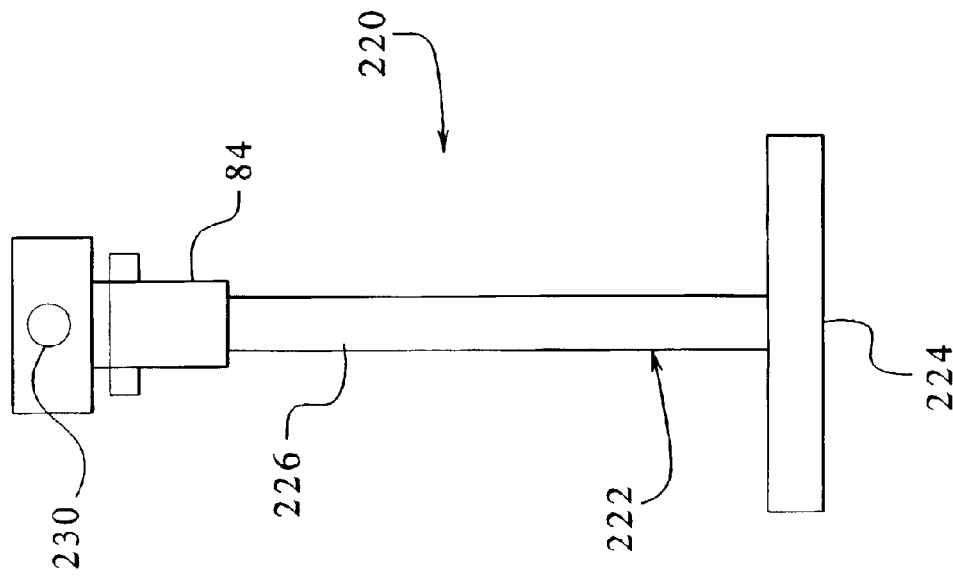
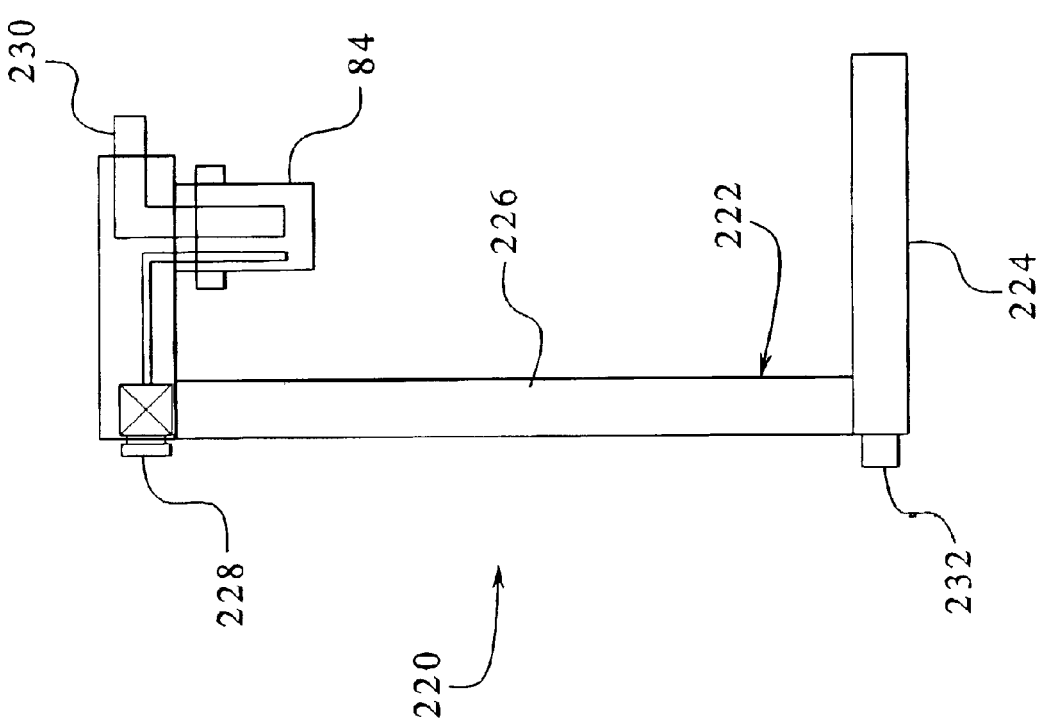

US 6,913,167 B2

WINE OR CHAMPAGNE PRESERVATION AND DISPENSING APPARATUS

PRIORITY CLAIM

This application is a continuation of, claims priority to and claims the benefit of U.S. patent application Ser. No. 09/996,332, filed Nov. 26, 2001 now U.S. Pat. No. 6,607, 100.

CROSS-REFERENCE TO RELATED APPLICATIONS

This patent application is related to the following co-pending commonly owned patent applications: "WINE OR CHAMPAGNE PRESENTATION AND DISPENSING APPARATUS," Ser. No. 09/996,332, "STOPPER FOR WINE OR CHAMPAGNE PRESERVATION AND DISPENSING APPARATUS," Ser. No. 09/995,309, "NITROGEN GENERATOR FOR WINE OR CHAMPAGNE PRESERVATION AND DISPENSING APPARATUS," Ser. No. 09/995,090, now U.S. Pat. No. 6,557,459; "COOLING SYSTEM FOR WINE OR CHAMPAGNE PRESERVATION AND DISPENSING APPARATUS," Ser. No. 09/997,307, now U.S. Pat. No. 6,557,369; "COOLING SYSTEM FOR WINE OR CHAMPAGNE PRESENTATION AND DISPENSING APPARATUS," Ser. No. 10/383,452, and "APPARATUS AND METHOD FOR PRESERVING COLLECTIBLE ITEMS," Ser. No. 10/390,843.

BACKGROUND OF THE INVENTION

The present invention relates in general to an apparatus for preserving and dispensing wine or champagne. One or more wine or champagne bottles may be stored in the apparatus for preservation and future use by a wine or champagne consumer.

Millions of people throughout the world drink wine and champagne. Numerous types of wine and champagne are produced in many countries throughout the world. Most wine and champagne are distributed to consumers in bottles. Wine and champagne bottles are usually sealed with a cork to prevent exposure to the air and to preserve the wine or champagne. Consumers of wine or champagne may drink an entire bottle, a significant portion of a bottle or only one glass of wine or champagne. Some consumers may drink a glass of wine a day while others may only drink one glass a week. When a bottle of wine or champagne is opened, the seal formed between the bottle and the cork is broken, air enters the bottle and the quality of the wine or champagne remaining in the bottle begins to degrade due to oxidation.

Wine begins to oxidize when it comes in contact with air and more specifically, with the oxygen present in the air. For a short period of time, oxygen and the process of oxidation benefit wine. With many types of wine, it is recommended to let the wine "breathe" before drinking. Breathing or exposing wine to ambient air for a short time allows a small amount of oxidation to induce the release of certain volatile compounds in the wine, which wine drinkers find to have a desirous effect on the wine's taste. Continued oxidation, however, eventually degrades every type of wine. To slow the degradation of the wine, a majority of wine is stored and preserved in bottles that are sealed with a cork or similar sealing device. However, uncorking or opening a wine bottle generally initiates the beginning of the end of a wine's useful or tasteful life. Red wines often degrade faster than white wines. Sweeter white wines tend to last longer, or degrade slower, than other white wines. Once the bottles are opened, most wines last less than a day even if the cork is properly replaced or the wine bottle is closed in a suitable period of time. In fact, the taste of some wines such as pinot noir, begins to degrade within thirty minutes after opening the bottle. This is problematic because, as indicated above, often times people do not finish a bottle of wine or champagne on the day the bottle is opened. Accordingly, wine and champagne are often wasted because people only consume portions of the wine or the champagne in a bottle and the remaining portions in the bottle lose their taste.

Attempts to reduce the oxidation and degradation of wine and thus to preserve wine have involved either limiting or eliminating the presence of oxygen to exposed wine surfaces. Since air includes approximately twenty-one percent oxygen, the attempts to preserve wine have involved either limiting or eliminating the presence of air to exposed wine surfaces. Simple procedures such as tightly replacing the cork and reducing the amount of air space or head space above the liquid level of the wine in the bottle are marginally effective at limiting the wine's degradation.

The problem with these simple procedures is practicality. Since wine is acidic and has a low pH, wine attracts oxygen from the open air. The extra hydrogen molecules of the wine seek electrons from the oxygen in the air. Longer exposures of wine to the open air increase the ionic balancing that takes place. Consequently, when a person forgets to immediately replace a cork after filling one or more glasses of wine, the degradation progresses and increases.

Other more complicated solutions for wine preservation are also known. The Vacu-Vin® Vacuum Wine Saver System manufactured by Vacu-Products B.V. Corporation is a device that manually evacuates the air from the head space inside a wine bottle to slow the degradation of the wine and to extend the preservation of the wine after the wine bottle is opened. This device includes a rubberized stopper that fits within the neck of a wine bottle similar to a cork. The stopper forms a seal in the neck of the bottle to prevent air from entering the bottle and remains in the bottle until the bottle is empty or discarded. A separate mechanical hand-held vacuum pump is attached to the top of the stopper and draws the air from the head space inside the bottle through the stopper and out of the vacuum pump attachment. A user pulls on a handle on the vacuum pump to draw the air out of the bottle. The user continues to draw the air out of the bottle by pulling on the handle of the vacuum pump attachment until a vacuum is created inside the wine bottle. Other known wine bottle vacuum devices combine the vacuum pumps with a dispenser, which enables the wine drinker or server to leave the stopper in place until the bottle is completed. If the stoppers do not have a dispenser, then the stoppers have to be removed and replaced in the same manner as a cork. Even with the stopper, the person must remember to intermittently evacuate the head space.

Head space evacuation also has a number of inherent problems. First and foremost, an evacuated head space has a sub-atmospheric pressure that works against whatever sealing device the stopper provides in an attempt to draw in oxygen laden air. In contrast, some nitrogen systems (described below) operate at a slightly elevated pressure inside the head space. These systems also work against the sealing device, but maintain a substantially inert atmosphere even if depressurized to atmospheric pressure.

Evacuating the head space is also a manually operated, mechanical and imprecise procedure. More head space requires more pumping, and people attempting to judge whether they have pumped enough are likely to pump too little, leaving air in the bottle, or pump too much, and unduly stress the stopper and the pumping mechanism. In short, known head space pumps do not consistently and reliably eliminate oxygen, do not provide positive pressure systems, require a separate pump or stopper for each open bottle, and require undesired manual operation by the wine drinker or server. Thus, trying to replace the head space in a bottle of wine is logistically difficult. People enjoying a glass of wine typically do not want to contend with such detailed or specific procedures.

Other known wine preservation and dispensing devices use an inert gas to blanket the head space in a wine bottle. These systems use an inert gas such as nitrogen from a large gas storage cylinder or smaller portable containers. Several types of such nitrogen preservation systems are known. Some systems preserve only one wine bottle and others preserve a plurality of wine bottles. Examples of such systems are disclosed in U.S. Pat. Nos. 4,477,477; 4,595, 121; 4,691,842; and 5,139,179.

U.S. Pat. No. 4,477,477 discloses an inert gas such as nitrogen dispensed into a wine bottle from a gas storage container such as a gas cylinder or gas cartridge. The inert gas travels through a tube and into the wine bottle. A sealing member is positioned around the tube and fits into the neck of the bottle to seal the bottle opening. The sealing member allows air to pass out of the bottle and the inert gas to be supplied to the bottle. The inert gas replaces the air, which would otherwise exist in the head space. Once the inert gas fills the head space of the wine bottle and a significant amount of the air inside the bottle is displaced, the sealing member and tube are removed from the bottle and the cork is replaced. This manual process is repeated each time the user desires to preserve the wine in the bottle after the bottle has been opened.

Similarly, U.S. Pat. Nos. 4,595,121 and 4,691,842 disclose devices for dispensing and preserving degradable liquids such as wine. These devices include a cap or stopper having a gas supply tube and a wine dispensing tube which is inserted into the opening of a wine bottle. The cap seals the opening of the bottle. A storage cylinder containing a non-degrading gas delivers the gas to the cap and into the wine bottle. The gas displaces the air inside the bottle. In U.S. Pat. No. 4,595,121, the cap or stopper disconnects from the gas supply tube and wine dispensing tube and remains in the wine bottle opening so that the user can store and preserve the wine for later use. In U.S. Pat. No. 4,691,842, the plug remains in the wine bottle until the bottle is empty.

Other known preservation systems employ a portable gas container which can be transported by a user and attached to an opened wine bottle at remote locations. One such device is disclosed in U.S. Pat. No. 5,139,179. In this device, a stopper is inserted into an open wine bottle to seal the bottle opening from the air. A small gas cartridge containing an inert gas such as nitrogen or carbon dioxide is then attached to the top of the stopper. When the cartridge engages the stopper, the cartridge releases the inert gas into the wine bottle. The inert gas displaces the air inside the bottle and promotes the preservation of the wine as well as the dispensing of the wine from the bottle. The gas cartridge is then disconnected from the stopper. The stopper remains in the wine bottle opening for storage and future use if desired. Other known wine preservation devices use a small portable gas canister or gas cylinder bottle to supply an inert gas to a wine bottle.

All of the above devices use a gas container such as a gas cylinder to supply the inert gas to a wine bottle. These devices have certain potential problems. The systems that utilize large gas cylinders provide a plentiful supply of inert gas; however, the cylinders are large and, therefore, hard to obtain, store or transport. A large gas cylinder is unattractive and too bulky to store in a kitchen or other convenient location in a home. The small portable gas canisters and cartridges are small enough to store under a sink or cabinet. However, these systems are limited because a canister or cartridge may only be used a limited number of times before running out of inert gas. Therefore, a user must store or transport several canisters or cartridges when using this type of system. Also, the canisters and cartridges must be replaced, which can be time consuming and expensive.

Nitrogen is preferably used in the wine preservation devices described above because nitrogen is an inert, non-flammable gas that is normally extracted from air in the atmosphere of the earth, which is approximately seventy-eight percent nitrogen. Other inert gases, such as argon could be used in place of nitrogen. Argon, in particular, is understood to be one of the best blanketing gases because it is a heavy gas (approximately 1.4 times heavier than nitrogen) and tends to pool over a target area. Argon, however, makes up less than one percent of air and is therefore generally too limited and expensive to be used for such purposes.

Wine consumers can also purchase pressurized aerosol canisters of nitrogen, which are supplied with long thin straw-like injectors. One such system is the "Private Preserve®" wine saver system. The injectors enable the person to inject an amount of nitrogen into the wine bottle to flush the air out of the bottle. This system suffers in a number of respects. First, the system is inexact in that the wine drinker has no way of knowing how much air is left in the bottle. Similar to the head space pumps, people are likely to inject too little nitrogen and create a less than optimal atmosphere or inject too much nitrogen and waste nitrogen. This system also requires the user to quickly replace a cork or stopper after filling the bottle or risk losing the nitrogen to the atmosphere. Because oxygen is heavier than nitrogen in ambient air, the air tends to settle into a non-covered head space. The process of removing a cork even for a short period of time likely causes air to enter the head space.

Unlike other nitrogen systems, the canister does not provide a positively pressurized head space for the wine bottle. The canister itself is limited in how much pressure it can hold and, more importantly, there is a pressure drop across the straw-like injectors so that the nitrogen exits the injector at the pressure inside the head space, which is atmospheric pressure. In short, existing nitrogen canisters do not have the ability to build pressure.

In a pressurized system, a gas such as nitrogen is supplied to a sealed wine bottle. As gas is supplied to the wine bottle, the pressure within the bottle increases. The pressure increases because the interior chamber space or volume of the wine bottle is fixed, yet more and more gas is being squeezed into that fixed space. To maintain an equilibrium or equal level of pressure with the ambient or outside pressure, the gas pressure inside the wine bottle will seek to equalize with the outside pressure. Thus, the force of the pressure within the wine bottle presses against the interior chamber walls of the wine bottle and the stopper to attempt to equalize with the lower outside pressure. The gas inside the wine bottle will therefore push through leaks or small openings around the stopper. Because the pressure inside the wine bottle is higher than the outside pressure, the outside air will not be able to push or move into the wine bottle through the same leaks or openings.

In a non-pressurized system, the pressure inside the wine bottle is equal to the outside pressure. Therefore, outside air can travel into the head space of the wine bottle as nitrogen travels out of it. Since there is no pressurization however, there is less gas flowing through the leaks. Also, due to the higher pressure inside the bottle, the pressurized systems enable wine to be dispensed without uncorking the bottle by forcing the wine up through a tube inserted into the wine bottle. Non-pressurized systems do not have this ability.

Known nitrogen systems that pressurize the head space of a wine bottle for wine preservation such as the ones described above, include a pressurized or bottled source of nitrogen. The pressurized canisters or cylinders of nitrogen present certain issues for manufacturers and users. Each cylinder or canister must have the proper wall thickness and be welded together or formed according to industry regulation. These systems also have fittings, tubing and gas flow components that are rated based on the operating pressure of the system. Nitrogen systems operating at higher pressures require more robust materials and components and are accordingly more expensive. Systems operating at lower pressures require more frequent refilling.

When the pressurized canisters or cylinders of the known nitrogen systems depressurize completely and thereby run out of nitrogen, the systems can no longer preserve wine until the person refills the canister or cylinder. The canisters or cylinders are refilled in two ways. The wine drinker typically discards a low pressure canister and replaces it with a new pressurized canister. These low pressure gas canisters are relatively expensive. Otherwise, with a high pressure system, the person must take the high pressure canister or cylinder to a cylinder filling shop for a refill. Cylinder filling shops are not always readily accessible and transporting high pressure cylinders creates the possibility that a cap or valve may come loose.

As indicated above, champagne is also a widely consumed beverage that is enjoyed all over the world for its taste and bubbly characteristic. Many types and brands of champagne exist in the market today. The above known preservation and dispensing devices may also be used to preserve and dispense champagne. Similar to wine, the champagne taste and consistency immediately begins to degrade after a bottle is opened. The oxidation of the champagne diminishes the taste of the champagne. Also, the exposure to the lower pressure in the atmosphere enables the bubbles in the champagne to escape. As the bubbles escape, the bubbly quality of the champagne decreases until there are no bubbles left in the champagne.

Accordingly, a need exists for a reliable, safe and efficient wine and champagne preservation and dispensing apparatus that uses an inert gas such as nitrogen, which is able to consistently and reliably pressurize the head space of a wine or champagne bottle. A need also exists for a wine or champagne preservation and dispensing apparatus that does not require canisters or cylinders that must be intermittently swapped out or refilled.

SUMMARY OF THE INVENTION

The present invention relates in general to an apparatus for preserving and dispensing wine or champagne. One embodiment of the apparatus is adapted to preserve and dispense wine from a plurality of wine bottles or preserve and dispense champagne from a plurality of champagne bottles. It should be appreciated that the present invention could be adapted for one bottle or container or multiple bottles or containers. The apparatus generally includes a housing having a frame and an access door pivotally connected to the frame which defines an interior chamber in the housing; a container support mounted in the interior chamber of the housing; a nitrogen generator mounted in the housing for generating nitrogen rich gas from ambient air and supplying the nitrogen rich gas for the wine or champagne bottles; a cooling system mounted in the housing for selectively chilling one or more bottles; one or more stoppers which are adapted to be attached to the wine or champagne bottles; and one or more dispensers attached to the housing and connected to the stoppers for dispensing wine or champagne from the bottles. The apparatus is preferably suitably sized to be placed on any flat surface such as a kitchen counter and includes a conventional power source having an electric cord and plug which is suitable for a standard electrical outlet.

The door of the housing provides access to the interior chamber or compartment of the housing and preferably includes a transparent or translucent window that enables a user to view the bottles inside the housing through the door when the door is closed. The container support holds a plurality of bottles and is mounted in the interior chamber or compartment of the housing. The support is preferably formed to receive a standard size wine or champagne bottle. Each bottle is supported by the container support at an angle for optimal viewing purposes, to minimize the height of the housing and to minimize the footprint of the housing on the counter top. The angle is greater than zero degrees and less than or equal to ninety degrees, is preferably between twenty degrees and seventy degrees and is most preferably between thirty-five and fifty degrees. In the illustrated embodiment, the angle is approximately thirty-eight degrees.

Each of the plurality of stoppers is adapted to be removably mounted in the opening of a bottle (i.e., after the bottle is opened or the cork is removed) to seal the bottle. Each stopper is connected to the nitrogen generator and the dispenser or dispensing system through suitable tubing or fluid (i.e., gas) communication lines. More specifically, each stopper includes a sealing member that seals the opening of the bottle, and a communication member that is removably attached to the sealing member. The sealing member is mounted in the opening of the bottle and seals the bottle from the outside air after the sealing member is connected to the communication member. The sealing member remains inside the bottle opening until the bottle is empty. Tubing from the nitrogen generator and the fluid dispenser or dispensing system is connected to the communication member. The communication member enables the nitrogen rich gas to enter the wine bottle and the wine to be drawn out of the bottle to the dispenser while preventing oxygen from re-entering the bottle. By keeping the oxygen out of the bottle, the flavor or taste of the wine (or champagne) remains long after the bottle is opened. It should be appreciated that wine and champagne are preferably maintained under different pressures in separate dispensing apparatuses of the present invention as discussed below.

Accordingly, to place a wine or champagne bottle in the interior chamber of the housing, a valve in the nitrogen port of the communication member is actuated to prevent the nitrogen rich gas from leaking out of the communication member when the communication member is disconnected from the sealing member. When the communication and sealing members are disconnected, the sealing member can be inserted into a new open bottle and the communication member reconnected to the sealing member. Upon reconnection, the valve is then actuated to permit the flow of nitrogen rich gas. It should be appreciated that the stoppers are interchangeable for use in different embodiments of the wine or champagne preservation and dispensing apparatus such as a portable apparatus as described below.

The nitrogen generator automatically generates nitrogen rich gas necessary for preserving wine or champagne inside the wine or champagne bottles. The nitrogen generator compresses ambient air and forces the air through an oxygen adsorbing member such as a carbon molecular sieve. The sieve preferentially adsorbs the oxygen molecules from the air and allows the nitrogen and other inert gases found in the atmosphere, to pass through the sieve. The collected nitrogen rich gas which is temporarily stored in a nitrogen gas storage tank and when necessary, is communicated through suitable tubing to the bottles. The nitrogen rich gas fills the head space over the liquid inside the bottles and blankets the liquid. The nitrogen rich gas blanket preserves the wine or champagne for a substantial period of time. The nitrogen generator generates nitrogen rich gas from air and accordingly eliminates the need to refill or replace nitrogen storage containers of the known devices described above.

The nitrogen generator efficiently separates nitrogen and other inert gases from the air for use in the wine or champagne dispensing apparatuses. However, it should be appreciated, that the nitrogen generator of the present invention does not need to be extremely efficient due to the unlimited supply of air and because substantial volumes of nitrogen rich gas are not needed due to the limited size of the bottles and because of the high levels of nitrogen in the atmosphere. This is contrary to existing commercial or industrial nitrogen gas generation systems which focus on efficiency and production volumes to maximize profit.

Inside the housing, one or more wine or champagne bottles may be chilled or cooled as desired. In one embodiment, a thermo-electric cooling unit draws in ambient air, removes the moisture from the air and cools the air according to a desired temperature inputted by a user. The cooled air is circulated by a fan located inside the housing. The fan supplies the cooled air to the desired sections of the interior compartments of the housing and cools or chills the wine or champagne bottles until a desired temperature is obtained. In one embodiment, the apparatus also includes one or more divider panels, which can be inserted in slots formed in the container support to separate certain bottles. In one embodiment, each divider panel preferably includes an air baffle, which may be manually adjusted between a fully open position, a partially open position or a closed position. The air baffles enable cooled air to pass through openings in the baffles to cool other divided sections in the housing to a desired temperature. Therefore, the divider panels facilitate the chilling of the bottles positioned on the container support adjacent to the cooling system and insulate the bottles positioned on the container support opposite the cooling system and on the other side of the divided panels. The divider panels thus enable a user to chill one or more wine bottles while keeping other bottles at a warmer temperature.

In another embodiment of the present invention, the cooling system includes cooling transfer members such as cooling pads or gel packs cooled by a thermo-electric cooling plate. In this embodiment, the container support has an inner and outer surface and a plurality of bottle receptacles for holding bottles on the support. Each receptacle has an area or a cutout or opening. A thermo-electric cooling plate is mounted below and adjacent to the inner surface of the container support and underneath each area or opening. The thermo-electric cooling plate is powered by a suitable power source and provides a cold top surface for chilling the bottles to a temperature that is less than ambient temperature. Alternatively, a plurality of cooling plates may be used for all areas. To generate the cold top surface, the thermo-electric cooling plate reverses the polarity of the metal plate. The reversed polarity creates a cold top plate surface and a warm bottom plate surface. The removable cooling transfer member or cooling pad is placed between the bottle and the thermo-electric cooling plate to transfer the cold temperature from the top surface of the cooling plate to the bottle (or to transfer heat from the bottle to the cooling plate). The temperature of a bottle can be adjusted by changing the amount or area of the cooling transfer member or cooling pad surface that contacts the cold surface of the thermo-electric cooling plate and the bottle. Alternatively, different size cooling transfer members or cooling pads may be employed. One or more bottles may be chilled using this cooling system.

The dispensing apparatus provides wine or champagne to a user or consumer through dispensers, such as spigots or faucets, mounted on the front of the housing. When a lever on a dispenser is actuated, a valve inside the dispenser opens and draws wine or champagne from the wine or champagne bottles and out of the dispenser. Releasing the lever causes the valve to close and stop the flow of wine or champagne out of the dispenser. Simultaneously, the nitrogen communication line, a one-way system, supplies nitrogen rich gas from the nitrogen storage tank into the bottle and continues to prevent oxygen from entering the bottle.

More specifically, the fluid pressure within the fluid communication lines of the wine preservation and dispensing apparatus preferably is set at approximately 5 pounds per square inch (psi). The pressure within the apparatus causes the internal pressure to be greater than the ambient pressure outside of the apparatus and therefore an unequal balance of pressure is created in the fluid communication lines of the dispensing system. When the dispenser valve is opened, the internal fluid pressure in the fluid communication lines of the apparatus pushes the fluid out of the bottles and into communication tubes that extend down into the bottles from the stopper assemblies. The wine or champagne travels through the communication tubes to the dispensers and then out of the dispensers to a user's glass.

In another embodiment, the wine or champagne preservation and dispensing apparatus is portable. The portable apparatus includes an insulated portable pack that preferably holds up to two wine or champagne containers; a cooling system which maintains a desired bottle temperature; and a nitrogen generator which generates nitrogen rich gas to preserve the wine or champagne in the containers. The stoppers used in the primary embodiment are interchangeable between the portable apparatus and the stationary apparatus in the primary embodiment of the present invention. The interchangeable stoppers enable a user to transfer a wine or champagne bottle from one apparatus to another quickly and with minimal exposure to the oxygen in the air. The portable apparatus may be powered by a conventional electrical plug and outlet; a cigarette lighter attachment for use in a car or other vehicle; a rechargeable battery; or other suitable power source. The portable apparatus enables a user to transport and consume wine or champagne outside of their home while preserving the quality and flavor of the wine or champagne.

In a further embodiment, the portable apparatus includes an insulated portable carrying pack and a nitrogen cartridge for providing nitrogen to preserve the wine or champagne in the pack. The nitrogen cartridge is refillable and in one embodiment can be refilled using a nitrogen dispenser as described below.

In yet a further embodiment, the portable apparatus includes a stopper, a nitrogen cartridge or storage tank, a spout, a bottle or container securing member and a clamp or holder for transporting, preserving and dispensing a single bottle of wine or champagne. The clamp snaps over the circumference of a bottle and secures the apparatus to the bottle. The stopper fits into the bottle opening and a nitrogen fill port enables a user to attach the apparatus to a nitrogen dispenser, such as a refillable nitrogen cartridge, to fill the nitrogen storage tank. A user tilts the bottle and presses a button to release nitrogen from the nitrogen storage tank and into the bottle. The pressure of the nitrogen forces the wine or champagne out of the spout and into a user's glass. The nitrogen preserves the remaining wine or champagne in the bottle for future use.

In another embodiment, a nitrogen dispenser enables a user to fill or re-fill the nitrogen cartridges used in the portable wine or champagne preservation and dispensing apparatuses. The nitrogen dispenser has a docking bay, which can be integrally formed with the stationary version or a stand alone version of the wine or champagne dispensing apparatus, which includes an attachment for connecting the nitrogen cartridges. In a further embodiment, the nitrogen dispenser is a separate unit that is attachable to a side of the stationary apparatus, or is integrally formed with the side, and is connected or connectable to one of the nitrogen communication lines in that apparatus.

It is therefore an advantage of the present invention to provide a self-contained and fully automatic wine or champagne preservation and dispensing apparatus.

Another advantage of the present invention is to provide a wine or champagne preservation and dispensing apparatus that automatically dispenses a desired quantity of wine or champagne to a user.

A further advantage of the present invention is to provide a wine or champagne preservation and dispensing apparatus that automatically generates nitrogen rich gas from air.

Another advantage of the present invention is to provide a wine or champagne preservation and dispensing apparatus that automatically generates, stores and provides nitrogen rich gas as needed to preserve the wine or champagne in one or more bottles.

A further advantage of the present invention is to provide a wine or champagne preservation and dispensing apparatus that uses a pressurized nitrogen rich gas without the need for refillable or replaceable containers.

Another advantage of the present invention is to provide a wine or champagne preservation and dispensing apparatus that generates nitrogen rich gas from air and chills one or more wine or champagne bottles to a desired temperature.

A further advantage of the present invention is to provide a wine or champagne preservation and dispensing apparatus that automatically dispenses nitrogen rich gas to refill a portable nitrogen container.

Another advantage of the present invention is to provide a wine or champagne preservation and dispensing apparatus that uses interchangeable stoppers that can be used in a stationary and a portable preservation and dispensing apparatus without removing the stoppers from the wine or champagne bottles.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIG. 24A is a side elevation view of the wine or champagne preservation and dispensing apparatus of one embodiment of the present invention where a single bottle can be preserved and transported.

FIG. 24B is a front elevation view of the wine or champagne preservation and dispensing apparatus of the embodiment in FIG. 24A.

DETAILED DESCRIPTION OF THE INVENTION

People who drink wine or champagne may only drink one glass, part of a bottle or some other quantity after opening a bottle. The wine or champagne preservation and dispensing apparatus of the present invention operates to preserve the flavor of the remaining quantity of wine or champagne in an opened bottle for a substantial period of time and also operates to dispense wine or champagne on an as needed basis. Referring now to FIGS. 1 through 4, the wine or champagne preservation and dispensing apparatus of one embodiment of the present invention, generally designated by the numeral 10, is alternatively referred to herein as the preservation apparatus, the dispensing apparatus or the apparatus. It should be appreciated that while the present invention is illustrated and discussed herein relative to an apparatus suitable for holding four bottles of wine or champagne, the present invention contemplates one or more bottles of wine or champagne. It should also be appreciated that wine and champagne are preferably maintained in separate dispensing apparatuses of the present invention due to the different levels of pressure needed to maintain wine and champagne, and that the dispensing apparatus of the present invention could be configured to maintain both wine and champagne. For purposes of this application, the apparatus is generally discussed with respect to the wine dispensing apparatus.

Figure 1:
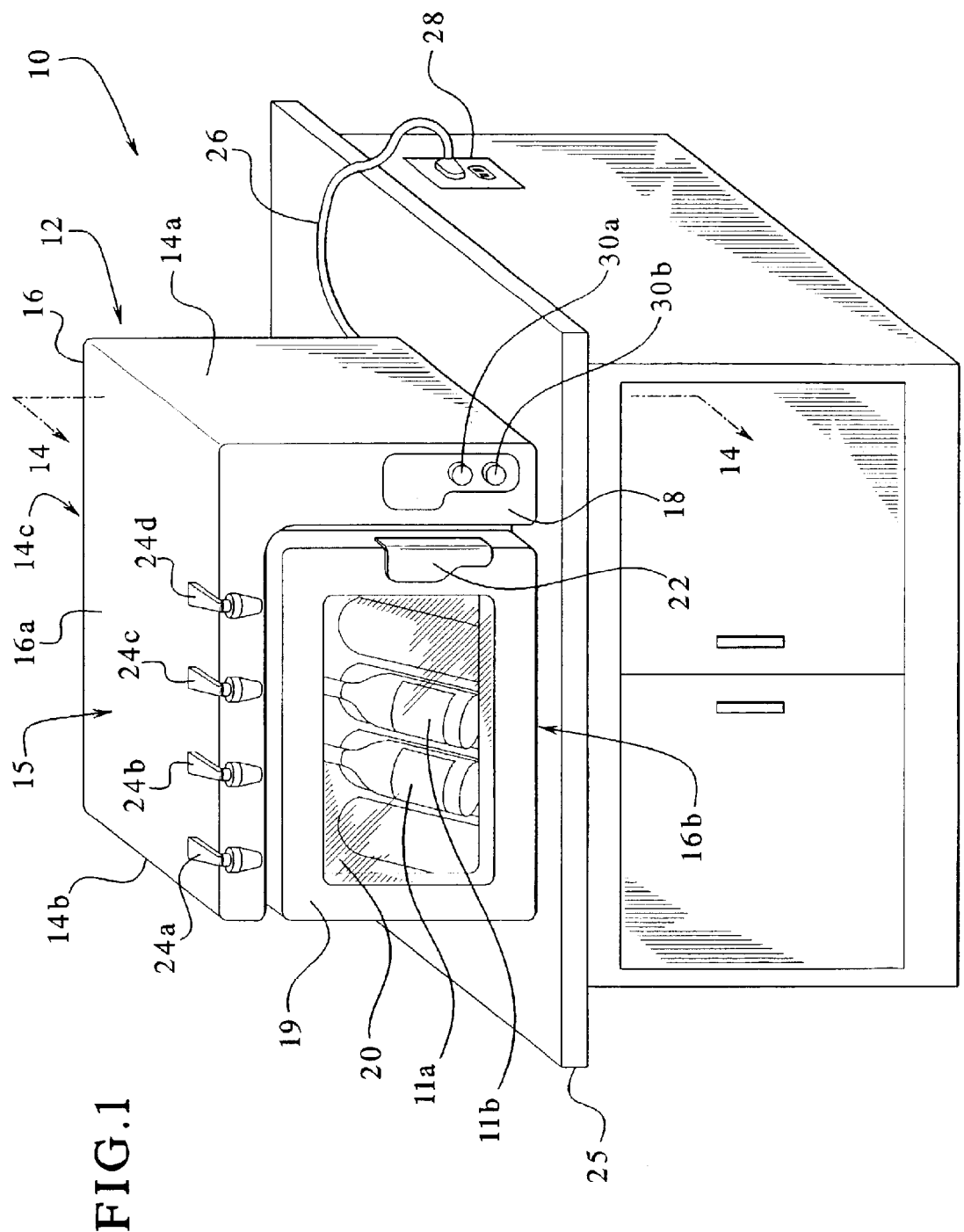
FIG. 1 is a front perspective view of the wine or champagne preservation and dispensing apparatus of one embodiment of the present invention with the door in closed position and with bottles viewable through the glass in the door.
Figure 2:
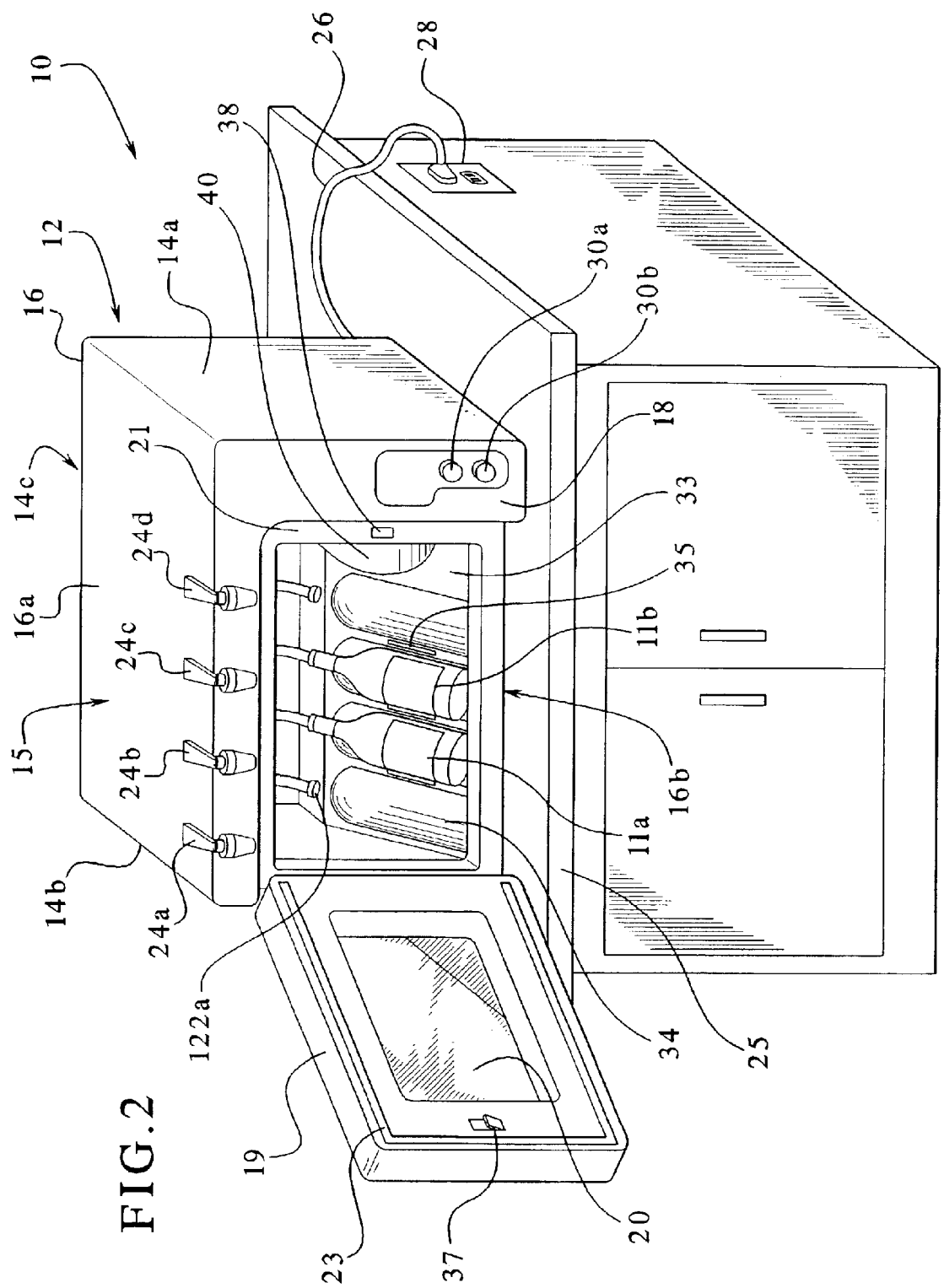
FIG. 2 is a front perspective view of the wine or champagne preservation and dispensing apparatus of FIG. 1 with the door in the open position.
Figure 3:
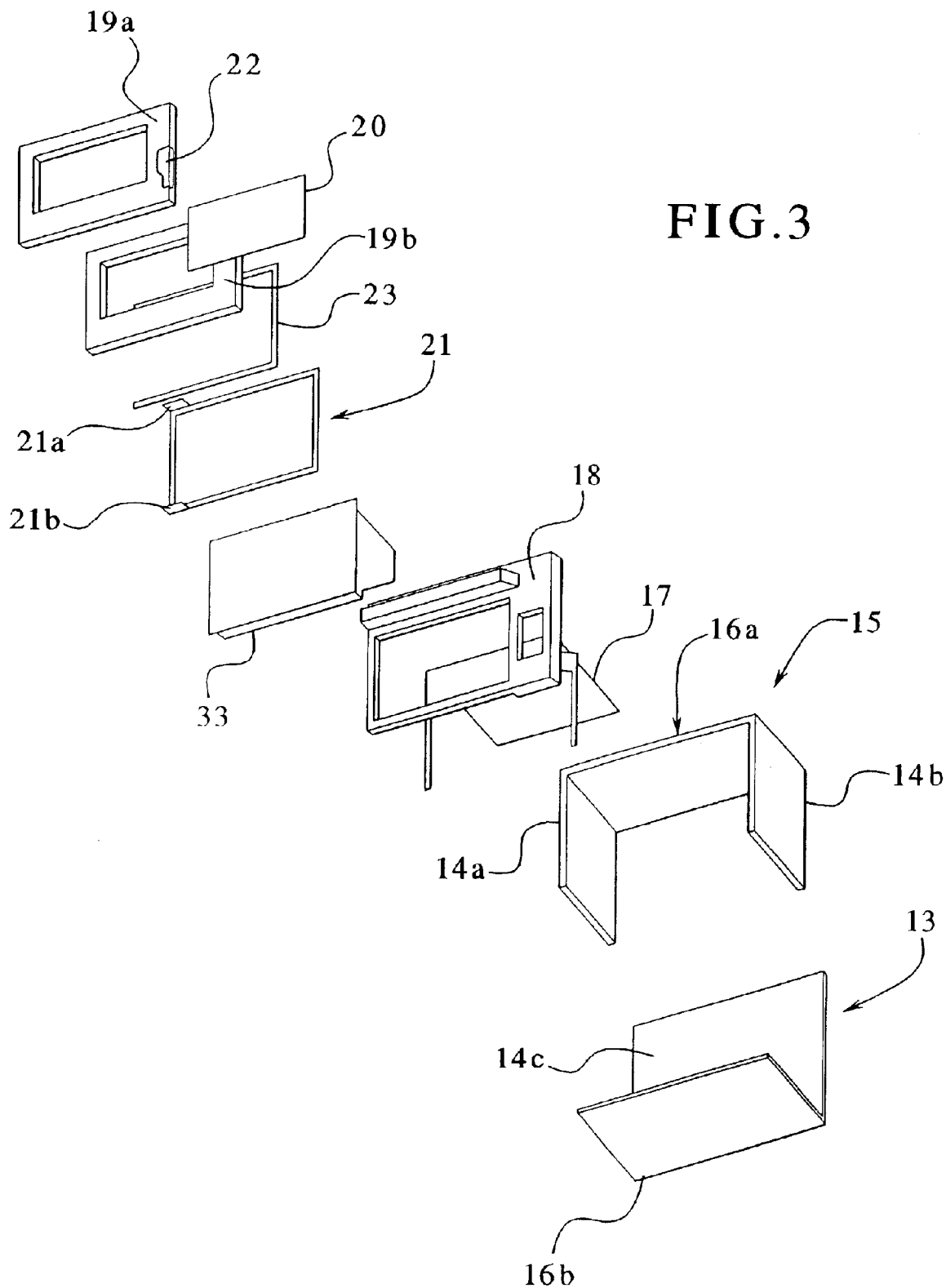
FIG. 3 is an exploded perspective view of the door, container support, bezel panel and frame of the wine or champagne preservation and dispensing apparatus of FIG. 1.

The apparatus 10 includes a housing 12 having a frame 16 with a bezel panel 18, a door 19 that is rotatably attached to the frame 16, and dispensers 24a, 24b, 24c and 24d that are connected to the front of the bezel panel. The apparatus 10 includes a container or bottle support 33 mounted inside of the frame 16 of the housing 12 to support the wine or champagne bottles 11a and 11b. The apparatus 10 includes a nitrogen or nitrogen rich gas generator 46 mounted in the housing 12 under or behind the container support 33. The nitrogen or nitrogen rich gas generator 46 draws in air, separates the nitrogen and other inert gases in the air from the oxygen and then supplies the nitrogen rich gas to a nitrogen storage container or storage tank 76 and then to the containers or bottles in the housing to provide optimal preservation of the wine or champagne. The apparatus 10 also preferably includes a cooling system 44 mounted in the housing 12, which chills or cools particular types of wine or champagne as desired. As illustrated in FIGS. 1 and 2, one embodiment of the apparatus 10 is preferably suitably sized to be placed on a counter 25, counter top or other substantially flat surface as desired by the user.

More specifically, one embodiment of the housing 12 has opposing side panels 14a and 14b, a back panel 14c, a bezel panel 18, a top panel 16a and a bottom panel 16b. The back panel 14c and the bottom panel 16b are integrally formed or otherwise attached in a conventional manner to form a chassis 13, which is the main support for the frame. Similarly, the top panel 16a and the two side panels, 14a and 14b, are integrally formed to provide the top or cover 15 of the frame. It should be appreciated that the side panels 14a and 14b, back panel 14c, top panel 16a and the bottom panel 16b may be attached in any order to assemble the frame. The chassis 13 and the cover 15 form the frame 16 of housing 12 and define the interior chamber of the housing 12. A support bracket 17 is mounted to the front of the frame 16 and bezel panel 18 is mounted to the support bracket.

The bezel panel 18 provides a decorative appearance for the front of the apparatus. The bezel panel 18 has a recessed area for mounting the door 19 so that the door is flush or even with the front surface of the bezel panel. It should be appreciated that the panels and the support bracket are preferably steel, however, any suitable material may be used in constructing the panels and support bracket. The frame 16 is the fundamental structure of the housing and protects the internal components of the housing 12. The container support 33, the nitrogen generator 46 and the cooling system 44 are mounted to or inside the frame 16 of the housing 12.

In one embodiment, the bezel panel 18 is decorated or designed using in-mold decoration to provide a decorative appearance. In-mold decoration molds or forms a design or pattern in the surfaces of the door and the bezel panel. Therefore, several different types of designs, patterns or logos can be formed in the front surface of the door. For example, a wood grain or wood panel design can be formed to make the apparatus appear as though it was manufactured with wood. The manufacturer could also place a company logo, image, or design in the front surface of the door and/or the bezel panel. The in-mold decoration enables a manufacturer to customize the appearance of the apparatus for a wide variety of users.

The apparatus 10 includes an insulated door 19 pivotally attached to a hinge frame 21 having hinge pins 21a and 21b and preferably includes insulation in the door (not shown). The door 19 includes a front door component 19a, a rear door component 19b, a glass panel 20 and a door seal 23. The glass panel 20 is suitably secured between the front and rear door components 19a and 19b, respectively, and enables a person to view the interior chamber of the housing 12. The glass panel 20 is preferably manufactured with thermo-pane glass that maintains the interior chamber conditions, such as temperature, within the housing 12. The glass panel 20 is also preferably surrounded with insulation (not shown) and transparent so that a person may read the labels on the bottles positioned inside the apparatus 10. It should be appreciated that the panel 20 may alternatively be manufactured with any suitable plastic material or any other suitable transparent material. Furthermore, the door 19 includes a door seal 23 attached to the outside of the rear door component 19b with suitable fasteners. The door seal 23 provides a substantially air-tight seal between the door 19 and the bezel panel 18 so that the temperature inside the apparatus may be maintained at a predetermined level. It should be appreciated that the in-mold decoration method described above may be used to customize the appearance of the door. Preferably, the appearance of the door matches the appearance of the bezel panel 18. However, any combination of designs, patterns, images or logos may be used to decorate the door and the bezel panel.

The hinge frame 21 includes hinge pins 21a and 21b, which slide or screw into corresponding holes on the top and bottom of the door 19 and enable the door to rotate about the pins. The hinge frame 21 mounts to the front of the bezel panel 18 with suitable fasteners and secures the door to the bezel panel. The door 19 provides access to the interior chamber or compartment of the housing 12 and specifically, to the container support 33 and the stoppers 84 (shown in more detail in FIGS. 8 through 13).

In one embodiment, the door 19 also includes a door handle 22, which enables a user to open the door. The door handle 22 is a recessed area formed in the door 19 and enables a user to fit a hand into the recessed area to pull the door open. In this embodiment, the door seal 23 includes a magnetic strip that is positioned along the top, bottom and non-hinge sides of the frame. The magnetic strip attracts the metal surface of the hinge frame 21 and holds the door closed against the bezel panel 18. The present invention also preferably includes a poron gasket (not shown) attached to the bezel panel 18 which facilitates an even closure. Alternatively, the door 19 may include a handle that mounts to the front of the door. Furthermore, the door may include a tab 37 that engages a corresponding receptacle 38 on the bezel panel 18 that secures the door against the bezel panel. It should be appreciated that other door handles and door latching mechanisms may be used as desired by the manufacturer.

The interior chamber of the housing 12 includes a container support 33. The container support 33 has a plurality of container or bottle receptacles 34 which are integrally formed in the container support to hold bottles, and a plurality of panel slots 35 defined by the container support. The receptacles 34 on the container support 33 slope at a predetermined angle for optimal viewing of the wine or champagne bottles in the interior chamber of the housing 12. Also, the container support is preferably vacuum formed from a durable material such as plastic and is removably attached to the frame 16 in the interior chamber of the housing 12.

The plurality of container receptacles 34 formed in the container support 33 are adapted to hold various sizes and shapes of wine and champagne bottles. In one embodiment, there are four container receptacles 34 spaced equally on the container support 33. It should be appreciated that the number of container receptacles 34 may vary depending on the size and shape of the frame 16 and housing 12. Preferably at least one panel slot 35 is located between each container receptacle 34. Each panel slot 35 is adapted to receive an optional divider panel 190 (shown in more detail in FIG. 16) to separate a bottle or bottles for cooling as further described below. In one embodiment of the present invention, each receptacle 34 defines an opening 36 (see FIGS. 18 and 20) near the middle portion of the receptacles. In one embodiment, a thermo-electric cooling plate 61 (see FIGS. 21A, 21B and 21C) is positioned underneath the area or opening and a cooling transfer member cooling pad 62 is adapted to be positioned in the areas or openings to facilitate the chilling of the bottles by the cooling plate as illustrated in FIGS. 17 through 21C and discussed below.

As indicated above, the apparatus 10 includes a dispensing system 50 having a plurality of dispensers 24 which dispense the wine or champagne to a user; an electrical system 42, which powers components of the apparatus; a cooling system 44 for chilling bottles of wine or champagne; a nitrogen generator 46 for generating nitrogen rich gas; and other components in housing 12.

Figure 4:
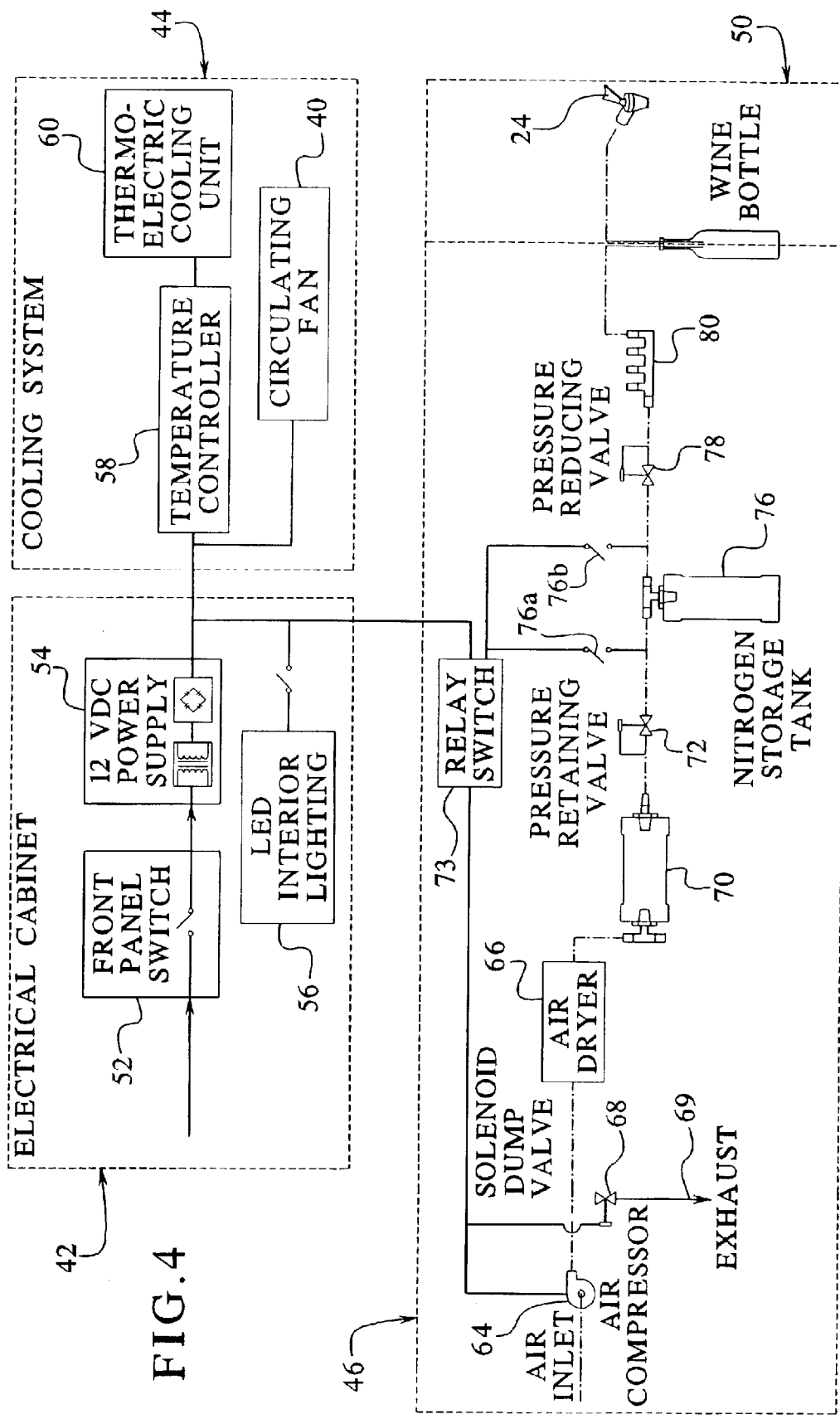
FIG. 4 is a schematic diagram of the wine or champagne preservation and dispensing apparatus of FIG. 1.
Figure 5:
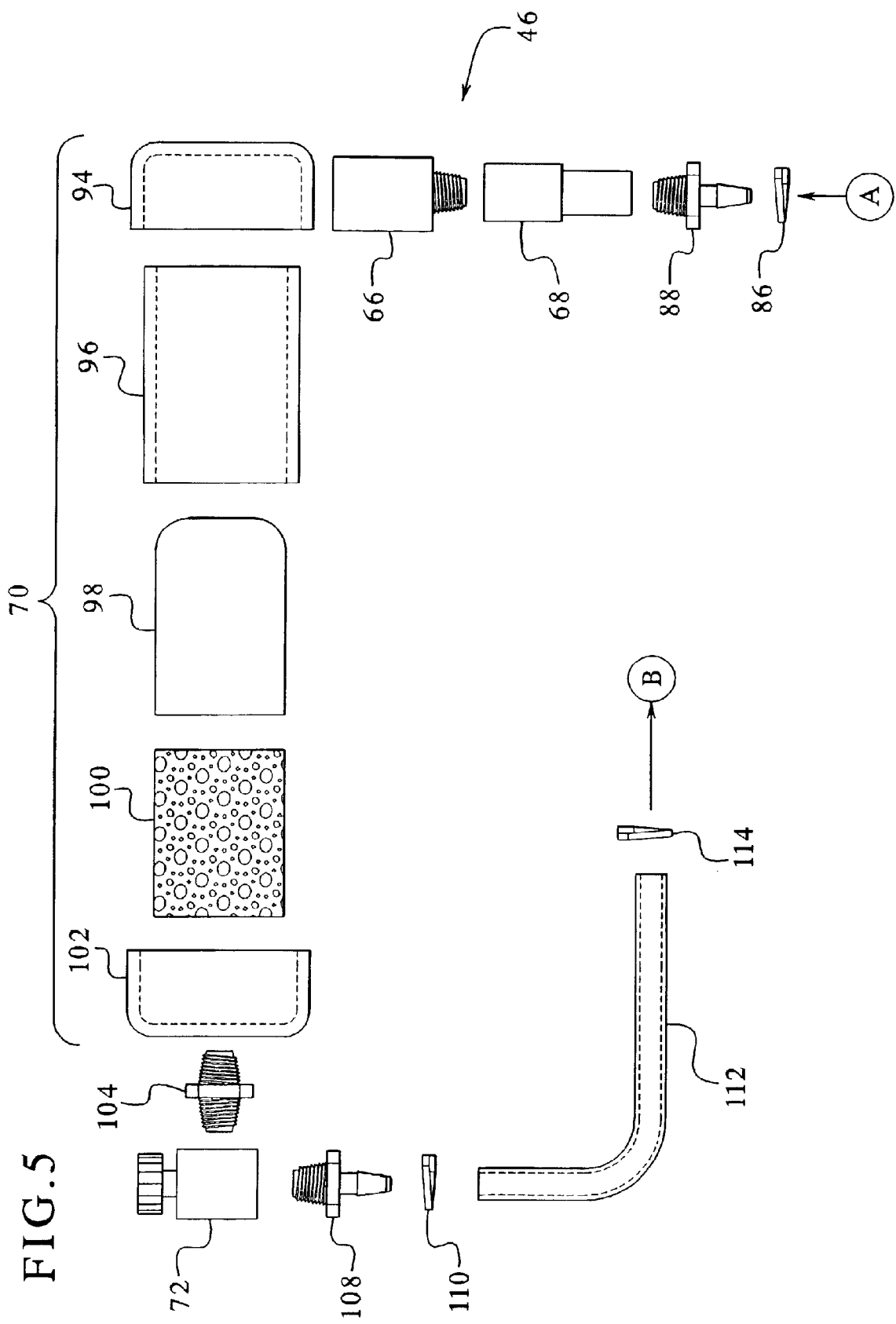
FIG. 5 is an exploded perspective view of the nitrogen generator of the apparatus of FIG. 1.
Figure 6:
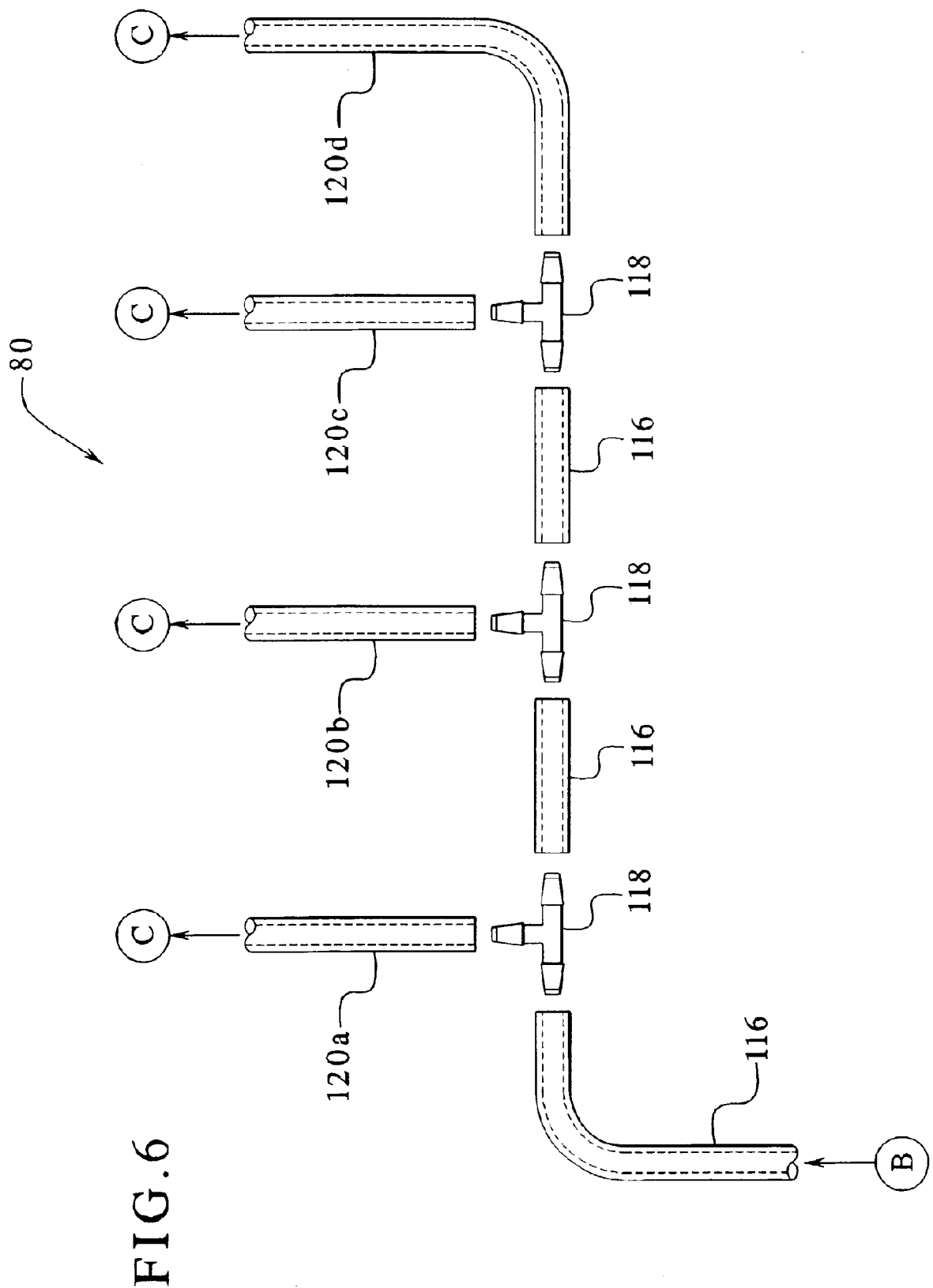
FIG. 6 is an exploded perspective view of the nitrogen gas manifold of the apparatus of FIG. 1, which distributes the nitrogen rich gas from the nitrogen storage tank to the bottles.
Figure 7:
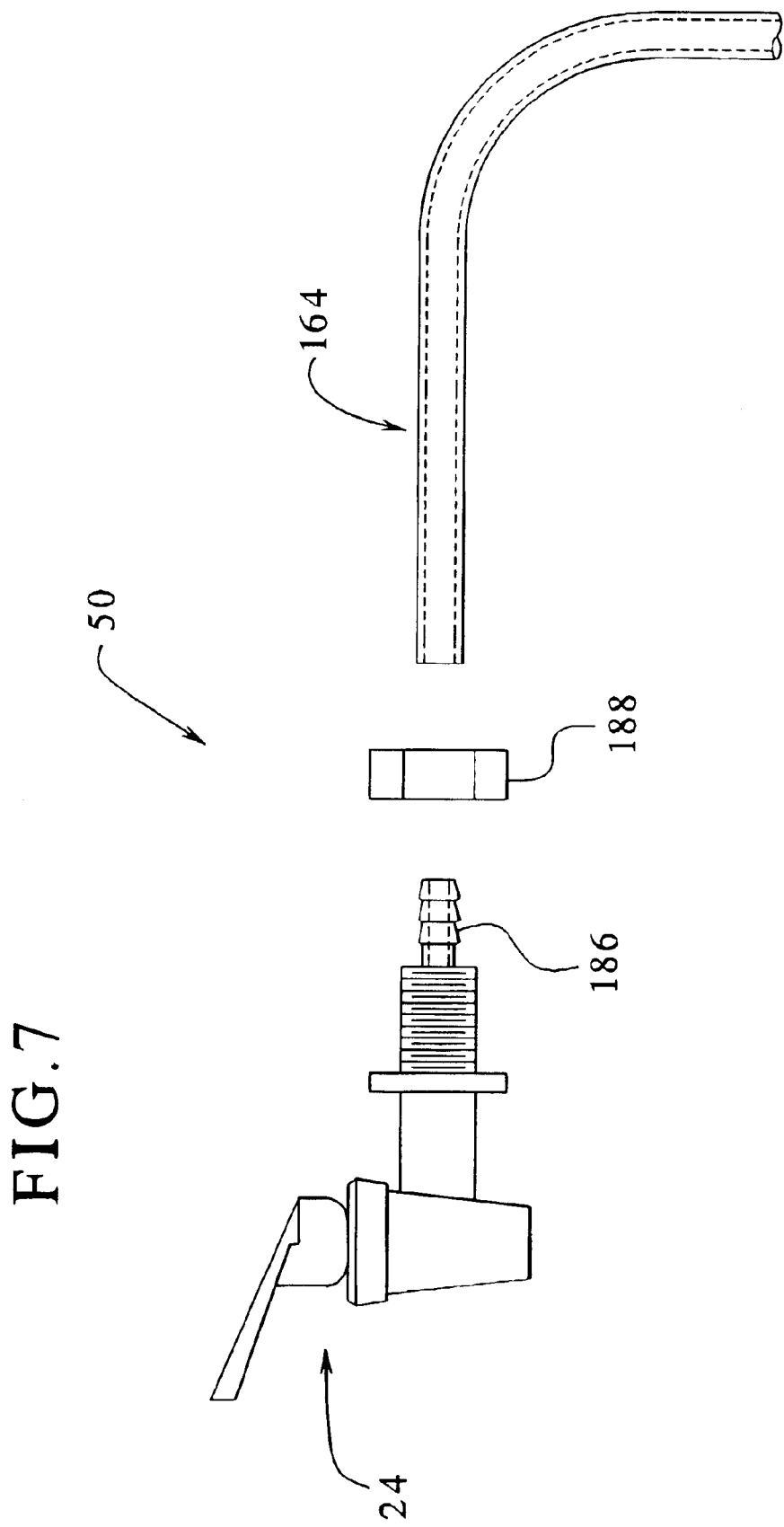
FIG. 7 is an exploded side view of a dispenser in the wine or champagne preservation and dispensing apparatus of FIG. 1.

Referring now to FIGS. 4 through 6, the nitrogen generator 46 generates nitrogen rich gas from ambient air. The nitrogen rich gas is supplied to the wine or champagne bottles via the nitrogen storage tank to displace the oxygen in the head space of the bottles (i.e., the open space above the wine or champagne inside the bottles) to limit oxidation and subsequent degradation of the wine or champagne. The nitrogen rich gas supplied to the bottles substantially reduces the oxidation process and preserves the wine and champagne for a significant period of time. This preserves the wine or champagne for subsequent use.

The nitrogen generator of the present invention can be pneumatically controlled, electro-pneumatically controlled or electrically or electronically controlled. One embodiment of the pneumatically controlled nitrogen generator is illustrated in FIGS. 4 and 5 and discussed in detail below. The nitrogen generator can be electrically or electronically controlled by conventional electric circuitry such as integrated circuits, controllers or processors. Additionally, parts of the nitrogen generator can be pneumatically controlled and parts can be electrically or electronically controlled. It should be appreciated that in the preferred embodiment, the nitrogen generator immediately begins operating when the apparatus 10 is connected to a power source.

In the embodiment of FIGS. 4 and 5, nitrogen generator 46 includes an air compressor 64 which draws ambient air into the housing 12 through a vent or other opening in the frame 16 and compresses the air. The air compressor 64 is attached to and directs the compressed air to an air dryer 66, which removes the moisture from the compressed air.

A pressure swing adsorption chamber 70 is attached to the air dryer. The dried compressed air from the air compressor 64 is supplied to the pressure swing adsorption chamber 70. A low pressure switch 76B senses the pressure in the nitrogen storage tank 76. When the low pressure switch 76B senses that the pressure inside the nitrogen storage tank 76 is below 20 psi, the switch closes and the relay switch 73 is energized. The energized relay switch 73 activates the solenoid dump valve 68 to close and activates or supplies power to the air compressor 64. The air compressor 64 supplies dried compressed air to the adsorption chamber 70 until the pressure in the chamber reaches 120 psi. Once the pressure in the chamber 70 reaches 120 psi, the pressure retaining valve 72 opens and the air in the adsorption chamber 70 passes through a carbon molecular sieve 100 having activated charcoal, which adsorbs the oxygen molecules in the compressed air. The remaining nitrogen rich gas, which includes a high concentration of nitrogen plus other inert gases, passes through the carbon molecular sieve 100 and enters the nitrogen storage tank 76. A high pressure switch 76A senses when the pressure in the nitrogen storage tank 76 reaches 110 psi. When the pressure in the nitrogen storage tank 76 reaches 110 psi, the high pressure switch 76A opens and de-energizes the relay switch 73. As a result, the air compressor 64 de-actives or shuts down and the solenoid dump valve 68 opens. Once open, the dump valve 68 vents or exhausts the oxygen molecules adsorbed by the carbon molecular sieve and returns the adsorption chamber 70 back to ambient pressure. The dump valve 68 also vents the moisture from the air dryer 66 out of the apparatus through the exhaust 69, which dries the dessicant in the dryer.

If the pressure of the dried compressed air inside the adsorption chamber 70 becomes too high, a high pressure relief valve (not shown) opens and releases the excess pressure to the atmosphere. The nitrogen storage tank 76 is attached to the adsorption chamber 70 and is adapted to store the nitrogen rich gas under the necessary pressure until it is needed. It should be appreciated that any reasonable pressure limits may be used to control the supply of nitrogen rich gas in the apparatus 10.

The pressure of the nitrogen rich gas is preferably reduced by a pressure controller such as pressure reducer 78 (illustrated in FIG. 4) because the nitrogen rich gas stored in the nitrogen storage tank 76 is at an elevated pressure, which is greater than the upper pressure limits of the bottles. The pressure reducer 78 decreases the pressure of the nitrogen rich gas from approximately 120 psi to approximately 5 psi for wine bottles. A manifold 80 (illustrated in FIGS. 4 and 6) is connected to the pressure reducer 78 and is adapted to distribute the nitrogen rich gas to the bottle or bottles.

FIG. 5 specifically illustrates one embodiment of the nitrogen generator 46 including individual parts to provide a further detailed description of how one embodiment of the nitrogen generator of the present invention operates. Compressed air enters the nitrogen generator through suitable tubing at "A" as indicated by the arrow in FIG. 5. The tubing is attached to the barbed end of a nylon fitting 88 and is secured to the fitting with a suitable hose clamp 86. The nylon fitting 88 has a male threaded end that screws into a female threaded receptacle on solenoid dump valve 68. The dryer assembly 66, which dries the compressed air, has a male threaded end that screws into a corresponding female threaded receptacle on the solenoid dump valve 68 and is attached to a cap 94 on the other end of the assembly.

The pressure swing adsorption chamber 70 of the nitrogen generator includes end caps 94 and 102, a pipe 96, a nylon mesh bag 98 and an activated carbon molecular sieve 100. The carbon molecular sieve 100 traps the oxygen molecules in the compressed air as the compressed air passes through the sieve. The sieve 100 is fitted into a nylon mesh bag 98, which holds the activated charcoal granules together. The pipe 96 is closed on both ends by caps 94 and 102.

One end of the adsorption chamber includes the dryer which has male threaded members to attach to the cap 94 and the solenoid dump valve 68. The dump valve 68 opens to release the oxygen molecules trapped by the oxygen adsorbing member or carbon molecular sieve and any excess pressure from the adsorption chamber 70 to the atmosphere. A dual threaded male nylon fitting 104 screws into cap 102 on the other end of the adsorption chamber. The nylon fitting 104 screws into a corresponding female threaded receptacle in the pressure retaining valve 72. The pressure retaining valve 72 controls the supply of nitrogen to the nitrogen storage tank 76. When the pressure in the adsorption chamber 70 reaches the predetermined set-point of the pressure retaining valve 72, the retaining valve 72 opens to supply the nitrogen rich gas to the nitrogen storage tank 76, while maintaining a constant pressure in the adsorption chamber 70.

A nylon fitting 108 having a barbed end and a male threaded end screws into the pressure retaining valve 72. Suitable tubing or a gas communication line 112 is attached to the barbed end of the fitting 108 and is secured with a suitable hose clamp 110. The hose clamp 110 prevents the tubing 112 from slipping off of the barbed end of the fitting 108. A suitable hose clamp 114 also holds the other end of the tubing 112 onto the nitrogen storage tank 76.

In operation, the compressed air enters the nylon fitting 88 at point "A." The air passes through fitting 88 and into dryer assembly 66 which contains a desiccant such as silica. The dryer assembly or air dryer 66 may be any suitable commercially available dryer. The desiccant adsorbs the moisture in the compressed air. The resultant dried compressed air exits the dryer assembly 66 and enters the adsorption chamber 70. In another embodiment, the dryer assembly is a separate unit that is connected to the adsorption chamber 70 via suitable tubing. In still another embodiment, the nitrogen generator 46 includes both a separate dryer unit and a dryer assembly 66 attached to the adsorption chamber 70 for drying the compressed air. Also, it should be appreciated that the desiccant used to dry the compressed air may be any suitable desiccant.

The dried compressed air enters the adsorption chamber 70 through cap 94. The dried air then passes through the nylon mesh bag 98 and over the carbon sieve 100. The carbon sieve includes activated charcoal that has very fine pores to promote the adsorption of the oxygen molecules from the air. The activated charcoal may be any suitable activated charcoal material such as Activated Charcoal #162 supplied by Takeda Chemical Industries. During the carbon adsorption process, the oxygen molecules diffuse at a higher rate into the narrow gaps of the carbon pore system and the nitrogen molecules and the other gases in the air diffuse at a lower rate into the carbon pores. Therefore, at optimized pressure, temperature, time and diffusion lengths, the majority of the oxygen molecules are removed from the air and the nitrogen molecules pass by the carbon sieve. When the pressure in the adsorption chamber 70 reaches 120 psi, the pressure retaining valve 72 opens. The nitrogen rich gas then passes through the pressure retaining valve 72, through nylon fitting 108 and tube 112 to the nitrogen storage tank 76 (shown in FIG. 4). Preferably, when the pressure in the nitrogen storage tank reaches 110 psi, the dump valve 68 opens, which enables the oxygen molecules to exhaust to the atmosphere through a vent (not shown) in one side of the housing 12. It should be appreciated that the concentration of the oxygen that is released back into the atmosphere is not high and within the safe limits established for household and commercial products.

When nitrogen rich gas is required to replace air in the head space of the wine bottles in the apparatus 10, the nitrogen rich gas is released from the nitrogen storage tank 76 through suitable tubing to the manifold 80 shown in more detail in FIG. 6. The manifold 80 disperses the nitrogen rich gas to each of the four stoppers (shown in FIGS. 8 through 13) in each bottle as discussed in greater detail below. The manifold preferably includes suitable tubing or fluid communication lines 116 and nylon tees 118. The tubing 116 fits over or overlaps the barbed ends of each tee. The barbed ends of the nylon tees fit securely into the tubing so that the tubing is prevented from slipping off of the tees. The nitrogen rich gas enters the interior space defined by the outer wall of the tubing 116 at point B and passes through each of the tubing lines 120a, 120b, 120c and 120d that extend from the tees 118. The tubing or fluid communication lines 120a to 120d transport the nitrogen rich gas to the stoppers 84. It should be appreciated that while nitrogen is preferred due to the volume of nitrogen in the air, other suitable inert gases may be generated to preserve the wine or champagne.

Referring back to FIGS. 1 through 4, the apparatus 10 includes a cooling system 44 which cools or chills one or more bottles of wine or champagne. It should be appreciated that the cooling system of the present invention can be controlled by a user (i.e., using a switch or temperature control), pneumatically controlled, electro-pneumatically controlled or electrically or electronically controlled. In one embodiment, the cooling system 44 includes a circulating fan 40 that circulates cooled air around the interior chamber of housing 12, and thereby cools or chills the wine or champagne bottles to a specific temperature desired by the user. The temperature of the cooled air is less than room or ambient temperature. In one embodiment, the cooling system turns on automatically when the apparatus is plugged into a conventional outlet. In one embodiment, a control device 30b is employed to turn on the cooling system.

In the second alternative embodiment, the control 30b enables a user to input a desired cooling temperature for the interior chamber of the housing 12. The cooling temperature selected by the user is communicated from the control device (not shown) to a temperature controller 58, which turns on or activates a thermo-electric cooling unit 60 until the desired temperature is achieved in the housing. For example, a temperature sensing device, such as a thermo-couple or thermometer (not shown) may be employed to sense the interior chamber temperature of housing 12. If the interior chamber temperature of the housing 12 is above the desired temperature, the temperature controller 58 signals the thermo-electric cooling unit 60 to provide cooled air to the interior chamber of housing 12. A circulating fan 40 circulates the cooled air from the cooling unit 60 around the interior chamber of the apparatus 10. The thermo-electric cooling unit 60 and fan 40 continue to provide cooled air to the interior chamber of housing 12 until the desired temperature is achieved. At that point, the temperature controller signals the cooling unit 60 and fan 40 to shut off.

Figure 21A:
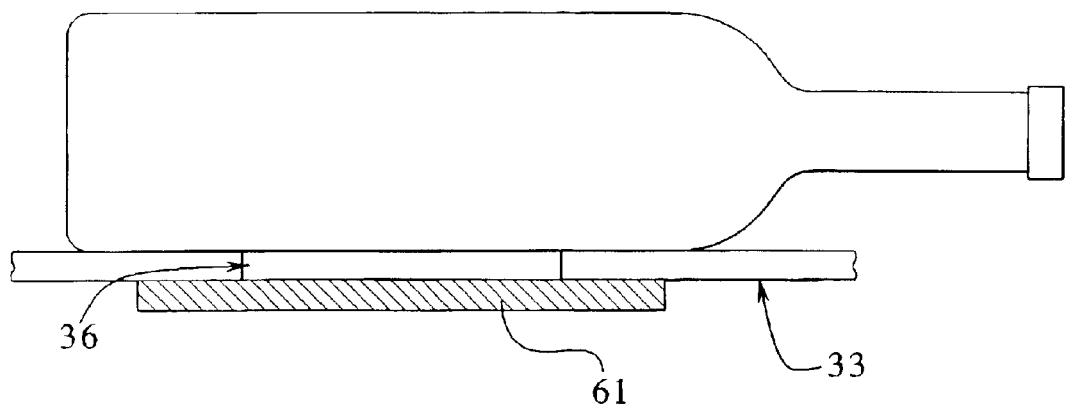
FIG. 21A is a side elevation view of a bottle positioned above an area or opening in a fragmentary portion of the container support where a cooling transfer member or cooling pad is removed from the top of a cooling plate for maintaining the temperature of a bottle at the ambient temperature.
Figure 21B:
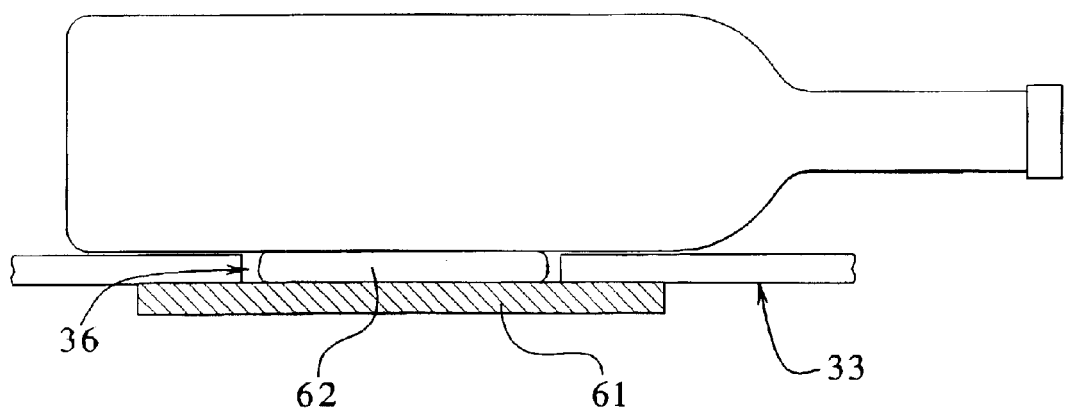
FIG. 21B is a side elevation view of a bottle positioned above an area or opening in a fragmentary portion of the container support where a cooling transfer member or cooling pad is placed completely in the area or opening above and adjacent to the top of the cooling plate for chilling the bottle to the maximum chill temperature of the cooling plate.
Figure 21C:
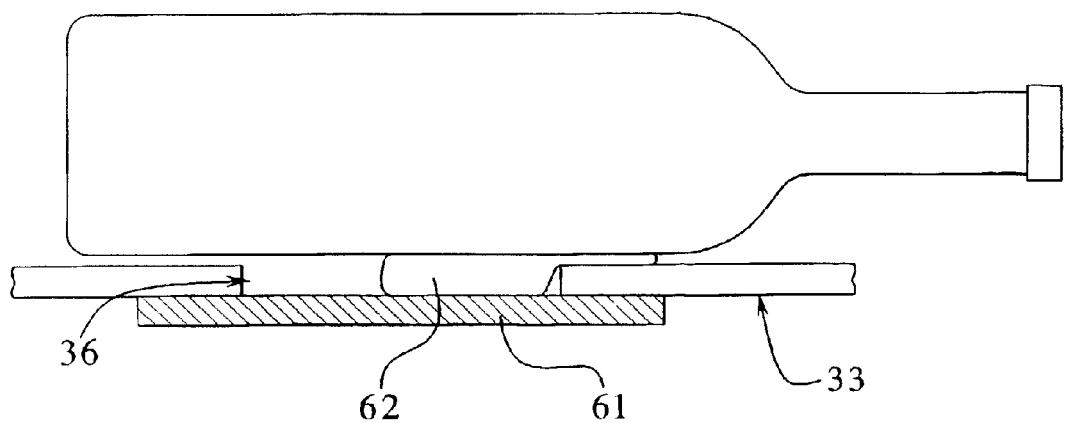
FIG. 21C is a side elevation view of a bottle positioned above an area or opening in a fragmentary portion of the container support where a cooling transfer member or cooling pad is placed in different position in the area or opening above and adjacent to the top of a cooling plate for chilling the bottle to a desired temperature.

Referring now to FIGS. 17 through 21C, another embodiment of the present invention is illustrated where the cooling system 44 includes a thermo-electric cooling member or plate 61, which is attached or positioned underneath the areas or openings 36 located in the container receptacles 34. It should be appreciated that more than one cooling member or plate 61 may be used. The cooling member or plate 61 includes a cold top area or surface, which is closest to the wine or champagne bottles, and a warm bottom surface. A cooling transfer member or cooling pad 62 such as a Gel-Pak manufactured by LIFOAM, Inc., is placed between the thermo-electric cooling member or plate 61 and the corresponding bottles located above the cooling plates as illustrated in FIGS. 21B and 21C. The cooling member or plate 61 provides a cold top surface or area and releases heat from the bottom surface. The heat is dissipated through vents (not shown) and possibly using a fan (not shown) located in the housing 12. The cooling transfer member or cooling pad 62 rests on top of the cooling member or plate in the area or opening 36 of the container support 33. The cool temperature from the cold top area or surface of the cooling plate is transferred to the cooling transfer member or cooling pad 62 and then to a wine or champagne bottle. In this manner, the bottles can be cooled or chilled to a preferred temperature as described below. Alternatively, an optional suitable temperature control device may communicate with the cooling member or plate 61 and cool or chill a bottle to a specific temperature as desired.

FIGS. 21A through 21C illustrates one embodiment of the present invention where the use of and positioning of the cooling transfer member or cooling pad 62 in area or opening 36 above the cooling plate 61 controls the temperature of a wine bottle. The wine bottle is positioned on the container support 33 adjacent to the area or opening 36 in the container support. If a user does not want to chill a bottle of wine such as with most red wines, the user does not place or position the cooling transfer member or cooling pad 62 in the area or opening 36 (as illustrated in FIG. 21A). Without the cooling transfer member or the cooling pad 62, the temperature of the cold top surface of the cooling member or plate does not transfer to the wine bottle. Therefore, the temperature of the wine bottle remains at or approximately at ambient temperature.

The temperature of the wine bottle depends on how much of the cold temperature of the cooling plate 61 is transferred to the bottle by the cooling transfer member or cooling pad 62. Therefore, to fully or completely chill a wine bottle, the entire cooling transfer member or cooling pad 62 must contact the cooling plate and the wine bottle as illustrated in FIG. 21B. A wine bottle may be chilled to other desired temperatures between the ambient temperature and the maximum chill temperature of the cooling plate 61 by changing the position of the cooling transfer member or cooling pad 62. In FIG. 21C, only part of the cooling transfer member or cooling pad 62 is contacting the cooling plate 61 and the bottle. Therefore, the wine bottle will be chilled or cooled to a temperature between the maximum chill temperature and the ambient temperature in the apparatus. Other desired temperatures can be achieved by changing the position and thereby the amount of contact between the cooling transfer member or cooling pad 62, the cooling plate 61 and the bottle.

It should be appreciated that other suitable cooling systems may be used to cool or chill the wine or champagne bottles in the apparatus. For example, the thermo-electric cooling plates 61 and one or more circulating fans 40 can be employed in the cooling system 44. In this example, a cooling plate is attached or positioned underneath the container support 33. The cooling plate or plates 61 generate a cold top surface as described above. The circulating fan, which is preferably attached adjacent to the container support 33, such as along side, beneath, behind or above the support, circulates air over the cooling plate or plates. The air is cooled by convection as the air crosses over and contacts the cold top surface of the cooling plate. The cooled air is circulated by the circulation fan and cools the bottles in the interior chamber of the apparatus. It should be further appreciated that any combination of the cooling plates 61, cooling transfer members or cooling pads 62 and one or more circulating fans 40 may be used in the cooling system 44.

The apparatus 10 also includes an electrical system 42 which provides power to the cooling system 44, the nitrogen generator 46, interior lighting 56 and other components located in the interior chamber of the housing 12. Referring to FIGS. 1 through 4, electricity is supplied to the apparatus 10 from a conventional electrical outlet 28 through a suitable electrical cord 26. Preferably, the apparatus includes a light button 30a, which turns the interior lighting on or off, and a chill button or control device 30b, which controls the cooling system 44. The apparatus is preferably automatically turned on by plugging the apparatus into a conventional electrical outlet which supplies electricity to power supply 54. Alternatively, when a switch 52 (see FIG. 4) is opened, the apparatus 10 is off and when the switch is closed, the system is on. Power supply 54 energizes and supplies electricity to the other components in apparatus 10. The interior chamber lights 56 are turned on or off by pressing the "lamps" button 30a. The interior chamber lighting 56 illuminates the interior chamber of the housing 12 so that a user is able to read the labels on the bottles in the interior chamber.

Referring now to FIGS. 1 through 4 and 7, the apparatus 10 includes a dispensing system 50 having a plurality of dispensers such as spigots or faucets, 24a, 24b, 24c and 24d, mounted on the front of the frame 16, and specifically to the bezel panel 18 of housing 12. The dispensers enable a user to dispense wine or champagne from bottles in the interior chamber of housing 12. While the apparatus 10 includes four dispensers, it should be appreciated that any number of dispensers may be used in the apparatus 10 depending on the size of the housing 12. Each dispenser 24a, 24b, 24c and 24d is preferably positioned over a container receptacle 34 in the container support 33, where each container receptacle 34 supports a bottle. This enables a user to easily select a wine or champagne bottle and to activate the dispenser corresponding to the desired wine or champagne in the selected bottle. It should be appreciated that the dispensers 24a through 24d may be any suitable dispensers.

The body of each dispenser 24 is placed through corresponding openings in the bezel panel 18 of the preservation and dispensing apparatus 10 and screwed into a nut 188, which is on the opposite side of the bezel panel, until the dispenser is flush against the bezel panel 18. The nuts 188 secure the dispensers in place on the bezel panel 18. The transport tubes 164 are attached to the barbed ends 186 of the dispensers. The barbed end provides a tight and secure fit to the transport tubes so that the transport tubes do not slip off of the dispensers 24a to 24d.

Referring now to FIGS. 8 through 13, the apparatus 10 includes a plurality of stoppers 84, and specifically a stopper for each of the four bottles that may be preserved in apparatus 10. Each stopper 84 attaches to a bottle to provide an air-tight seal in the opening of each bottle and to enable nitrogen gas to flow into the bottles and liquid to flow out of the bottles to the dispensers 24a to 24d.

The stopper 84 includes a communication member 122a and a sealing member 122b. The communication member 122a is attached to the gas or nitrogen supply communication line or tubing and to the fluid communication lines or tubing connected to the dispensers 24a to 24d. The sealing member 122b is inserted into the opening of a bottle (i.e., similar to the way a cork fits into a bottle opening). The communication member 122a is removably attachable to the sealing member 122b. If the communication and sealing members 122a and 122b are separated or disconnected from each other, the communication member 122a remains sealed to prevent the nitrogen rich gas from leaking out of the communication member. The individual parts of the communication and sealing members 122a and 122b, respectively, are shown in more detail in FIGS. 9 to 13 to describe how the parts interrelate and operate within each stopper 84.

The communication member 122a includes a top plate 124, two barbed locking arms 125, stop valve spring 128, stainless steel check ball or sealer 130, o-ring 132 and upper body 134 having gas inlet port 136 and liquid outlet port 137, disconnect gas probe 138, disconnect liquid probe 139 and o-rings 140.

The sealing member 122b includes a lower body 142, bottom plate 150 that is permanently secured to the lower body, flanged rubber stopper 156 and transport tube 164. The lower body 142 has a liquid port 144, gas port 146, two lock receivers 147 and two lock slots 148. The bottom plate 150 of the lower body includes a liquid port 151, stop valve actuator post 152, one or more nitrogen ports 155 and an outer rim 154. The flanged rubber stopper 156 has a rubber flange 158, outlet port 160 and a flanged stem 162. A transport tube 164 transports the liquid from the bottles to the stopper. The transport tube 164 includes an upper draft tube 166 and end tube 168.

The top plate 124 is permanently secured to the upper body 134. Locking arms 125 are integrally molded to the top plate 124 and slide into the corresponding channels 135 on upper body 134 to secure the top plate and upper body 134 to the sealing member 122b. The tabs 126 located on each locking arm 125 are received by the corresponding lock receivers 147 on the lower body 142 and the tabs 126 engage the lock slots 148. When the tabs 126 engage lock slots 148, the top plate 124 is secured in place on top of the upper body 134 and to lower body 142.

Figure 9:
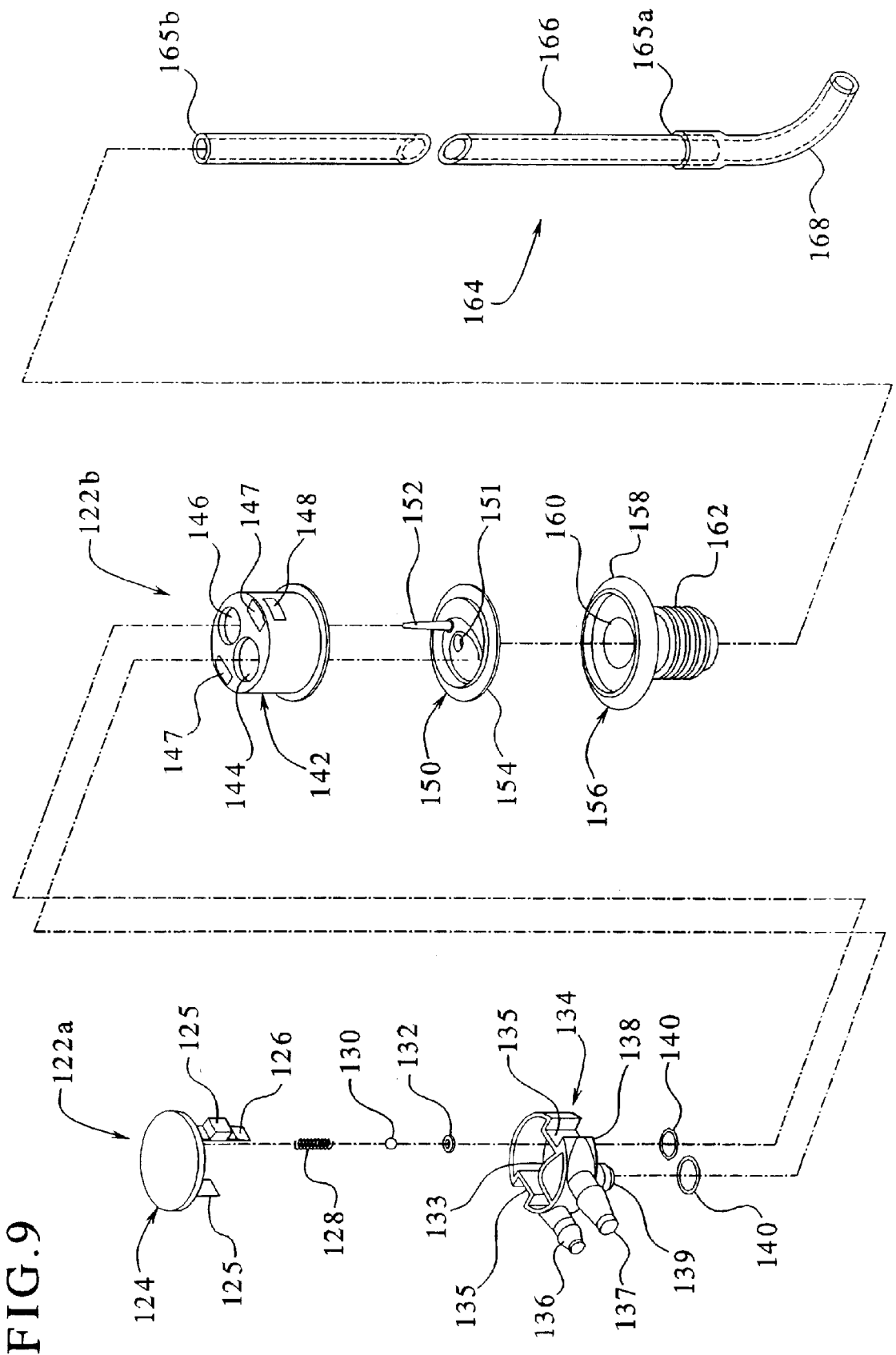
FIG. 9 is a further exploded perspective view of the stopper of FIG. 8.
Figure 10:
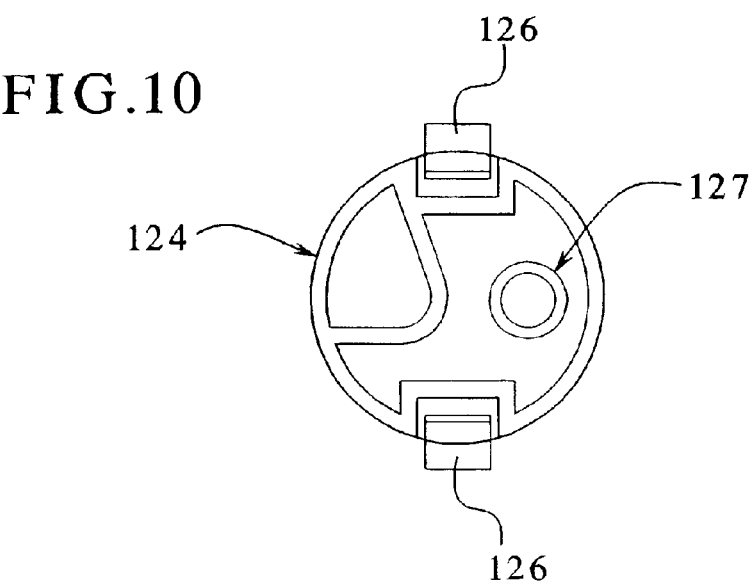
FIG. 10 is a bottom view of the top plate that is attached to the top of the communication member of the stopper of FIG. 8.
Figure 11:
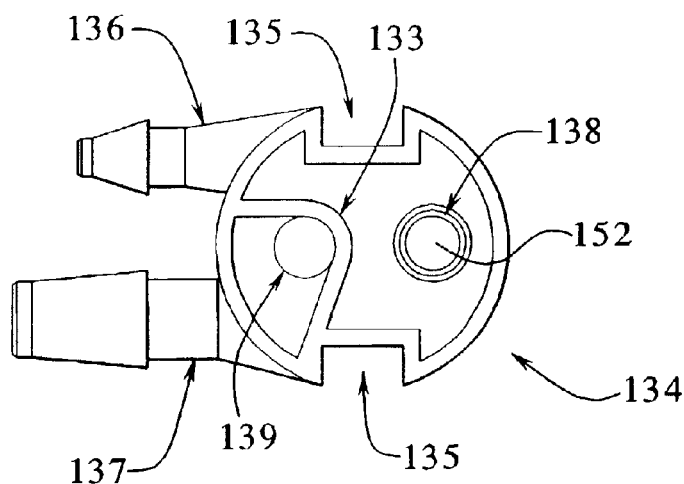
FIG. 11 is a bottom view of the communication member in the stopper of FIG. 8.

The stop valve spring 128, stainless steel check ball 130 and o-ring 132 are positioned inside the upper body 134 and in-line with the gas port 146 on the lower body 142. As shown in FIGS. 9 and 10, the spring 128, check ball 130 and o-ring 132 are kept in place by guide tube 127. The guide tube 127 is integrally formed with top plate 124 and extends downward from underneath the top plate 124. To securely fit over the spring 128, check ball 130 and o-ring 132, the guide tube 127 has a diameter that is slightly smaller than the largest diameter of the spring 128, ball 130 or o-ring 132. As the top plate 124 is placed onto the upper body 134, the guide tube 127 slides over spring 128, ball 130 and o-ring 132, thereby locking these three components in place. Although these three components are stationary, the spring 128 and check ball 130 can move up and down freely within the guide tube 127.

The bottom plate 150 is permanently secured to the lower body 142. Additionally, the bottom plate 150 is secured to the flanged rubber stopper 156 by placing the bottom plate 150 on top of the rubber stopper 156. The circular rubber flange 158 slides over the outer rim 154 of the bottom plate 150, which joins the bottom plate of the lower body 142 to the rubber stopper 156 and provides an air-tight seal between the bottom plate of the lower body and the stopper. Furthermore, the upper body 134 and the lower body 142 are secured together by locking arms 125, tabs 126 and lock slots 148 so that the stop valve actuator post 152 is aligned directly below and in the center of gas port 146. The upper body 134 can be released from the lower body 142 by pressing tabs 126 inward and pulling the upper and lower bodies apart.

Figure 12:
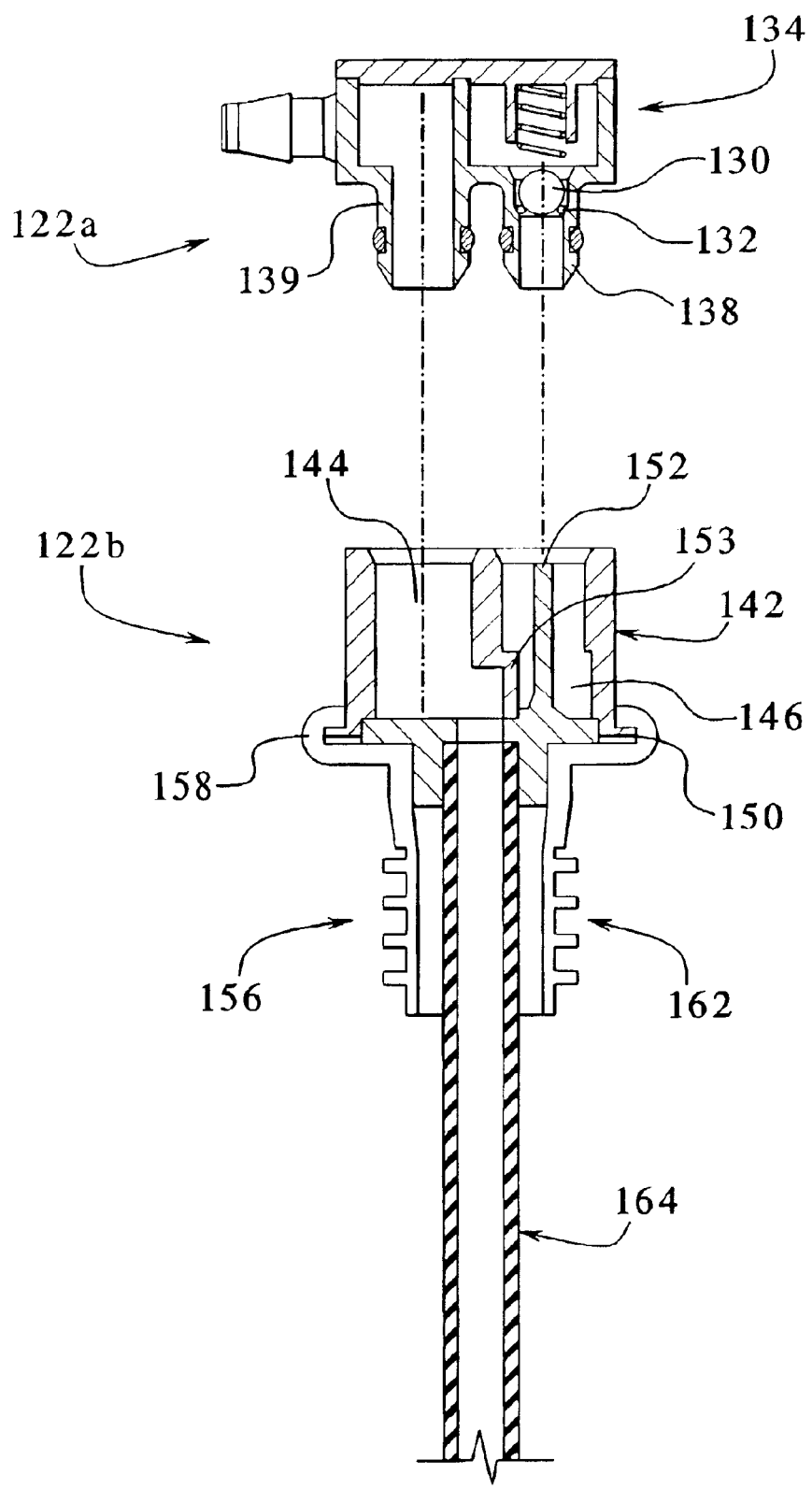
FIG. 12 is a cross-sectional view of a stopper taken substantially through line 12—12 of FIG. 8 illustrating the connection of the communication member to the sealing member of the stopper of FIG. 8.

An end 165a of the upper draft tube 166 is connected to the end tube 168. The end tube 168 has a slightly larger inside diameter than the upper draft tube 166 so that the end tube fits securely over the upper draft tube end 165a as illustrated in FIG. 9. The end tube 168 is curved to reach the lowest interior points of the bottles so that all of the liquid inside of the bottles is dispensed to the user. The other end 165*b* of the draft tube 166 is inserted into the bottom of the outlet port 160 and passes through the middle portion of the stopper 84 to the liquid port 144 of the lower body 142. As shown in FIG. 12, a separator wall 153 separates the liquid port 144 from the gas port 146 inside the lower body 142. Therefore, the liquid that passes through the transport tube 164 into the lower body 142 does not mix with the gas that passes through gas port 146.

Figure 14:
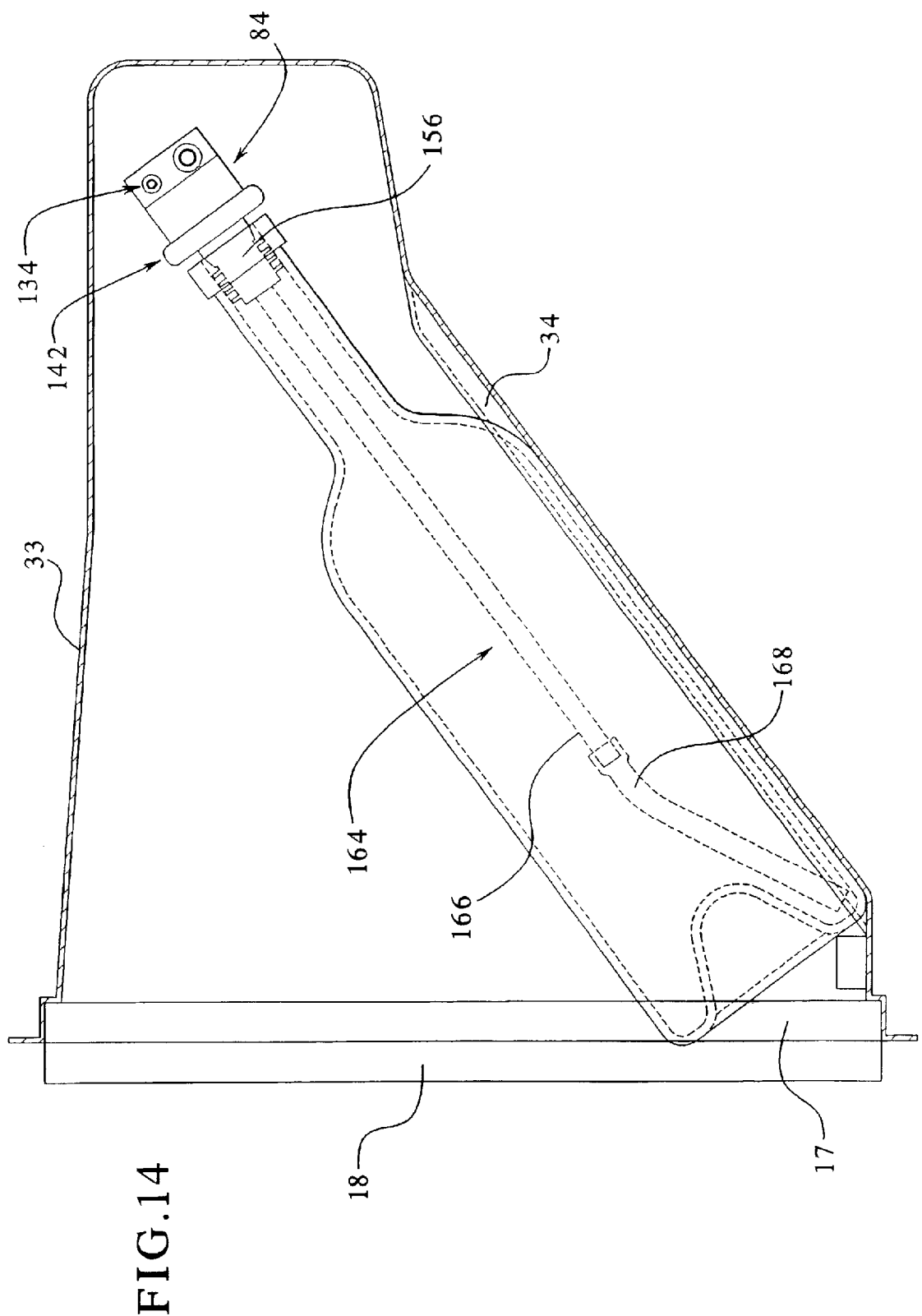
FIG. 14 is a cross-sectional view taken along a portion of line 14—14 in FIG. 1 illustrating a bottle positioned on the container support of the apparatus.

In operation, the sealing member 122*b* is placed securely into a bottle that contains wine or champagne by inserting the flanged stem 162 of the rubber stopper 156 into the bottle opening. The annular flanged rings located on the flanged stem press against the inside walls of the opening to seal the interior chamber of the bottle from the outside ambient air. As the flanged stem 162 is inserted into the bottle opening, the transport tube 164 is also inserted down through the bottle opening and into the liquid inside the bottle. The bottle or sealing member 122*b* rotates so that the end tube 168 on the transport tube 164 is located in the lowest point of the interior chamber of the bottle (as illustrated in FIG. 14).

The gas inlet port 136 on the communication member 122*a* is connected to tubing or gas communication line that extends from the nitrogen generator 46. Similarly, the liquid outlet port 137 is connected to tubing or liquid communication line that extends between the liquid outlet port 137 and one of the dispensers 24*a* to 24*d*. The tubing is secured to the barbed ports 136 and 137 by hose clamps or any other suitable device. After the communication member 122*a* is secured to the tubing, the bottom of the communication member is placed on the top of the sealing member 122*b*, which is firmly secured in the bottle opening.

O-rings 140 are placed onto the disconnect gas probe 138 and the disconnect liquid probe 139 and the probes are inserted into corresponding liquid port 144 and gas port 146 on the lower body 142. The o-rings 140 and annular flanges on the probes provide an air-tight seal between the probes of the communication member 122*a* and the sealing member 122*b*.

As the gas probe 138 is inserted into the gas port 146, the stop valve actuator post 152 extends through the center of the gas probe 138 and against the bottom of the check ball 130. The length of the actuator post 152 is predetermined so that the actuator post 152 is of a sufficient length to extend through the gas probe 138 and push the check ball 130 upwards against the valve spring 128 and away from the o-ring 132. Once the check ball 130 is pushed upwards away from the o-ring 132, the seal established between the ball and the o-ring is broken, thereby enabling the nitrogen rich gas to pass through the gas port 146 and into the gas probe 138.

When the sealing member 122*b* is disconnected or removed from the communication member 122*a*, the pressure of the actuator post 152 on the check ball 130 is gradually released as the post moves downward away from the ball. At the same time, the valve spring 128 pushes against the top of the check ball 130 inside the guide tube 127. The spring biases or forces the check ball 130 to move downward and into the o-ring 132, which seals the gas port opening into the gas probe 138. Therefore, the gas inlet line attached to the communication member 122*a* can remain attached to the upper unit because the check ball 130 and o-ring seal prevents any gas from escaping. It should be appreciated that the valve spring 128 is sized and designed to provide a sufficient amount of force to the top of the check ball 130 so that the check ball 130 maintains the seal between the ball 130 and the o-ring 132.

Once the communication member 122*a* is attached to the sealing member 122*b*, the actuator 152 presses against the check ball 130 and enables the nitrogen rich gas generated by the nitrogen rich gas generator to flow through the stopper. The nitrogen rich gas flows into the gas probe 136 via suitable tubing that extends from the nitrogen gas manifold (as illustrated in FIG. 6). The nitrogen rich gas enters the stopper assembly at 5 psi to provide a steady stream of wine through the dispensers to a user, to provide positive pressure and to prevent carbonation of the wine or champagne. The nitrogen rich gas travels through the gas probe 136 into a chamber inside the upper body 134. The upper body 134 is separated into two chambers by a wall 133 thereby preventing the mixing of the nitrogen rich gas and the liquid inside the upper body 134.

Figure 13:
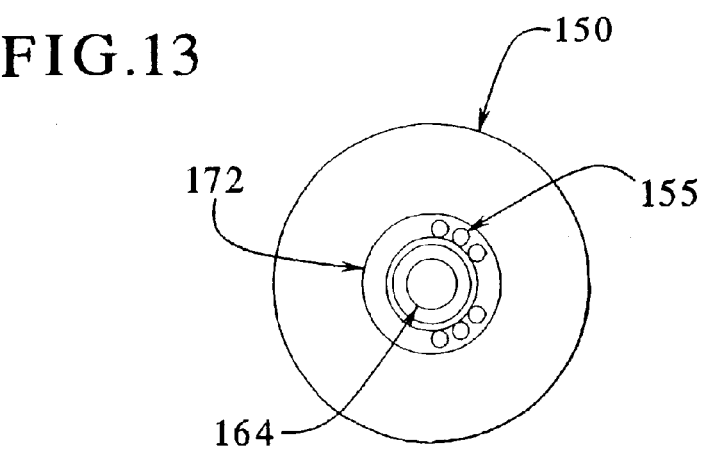
FIG. 13 is a bottom view of a bottom plate that attaches to the bottom of a sealing member of the stopper of FIG. 9.

The nitrogen rich gas fills the chamber and flows underneath the check ball 130 into the gas probe 138. The gas then fills the gas chamber 146 in the lower body 142. Referring to FIGS. 12 and 13, the nitrogen rich gas flows through the bottom plate 150. The bottom plate has annular gas slots 172 located in the gas chamber 146 of the lower body 142. The nitrogen rich gas, therefore, flows through the gas slots 172 in the bottom plate 150. The gas travels through the center of the stopper stem 162 and outside of the transport tube 164 down into the bottle. The nitrogen rich gas dilutes the ambient air, and particularly the oxygen, that is found in the head space of the bottle and significantly decreases the degradation of the wine or champagne due to the continued presence of additional oxygen in the head space.

The compressed nitrogen rich gas in the bottles also promotes the transport of the wine or champagne from the bottles to the dispensers. Because the pressure inside the bottles is higher than the ambient pressure outside the bottles, a suction effect is produced anytime an opening is created in the dispensing system. Therefore, when a valve is opened in a dispenser, the high pressure of the system wants to equalize with the low ambient pressure outside the apparatus 10. Since the pressure of the nitrogen rich gas is maintained at a constant level inside the bottles, pressure equalization will occur whenever a dispenser valve is opened. The pressure equalization provides a suction effect inside the system so that the liquid inside the bottles is drawn out of the bottles and travels through the transport tube 164 to the dispensers.

Once a dispenser valve is opened, the liquid inside the bottles flows up through the transport tube 164 and into the liquid chamber 144 of the lower body 142. The liquid then flows into the liquid probe 139, through the upper body 134 and into the liquid port 137. From the liquid port 137, the liquid flows through the tubing to the dispenser and into the glass of a user. Once the dispenser valve is closed, the suction effect ceases and the wine discontinues its flow from the bottle to the dispenser. Furthermore, any of the dispensers may be held open after a bottle is empty to fill the transport tubes and associated tubing with nitrogen rich gas and purge wine residue from the system. This process ensures that a new replacement bottle will not be contaminated by oxygen or wine residue that remains in the dispensing system. However, it should be appreciated that the entire dispensing system is sealed so that no air enters the bottles from the dispensers and no wine leaks from the system.

Figure 15:
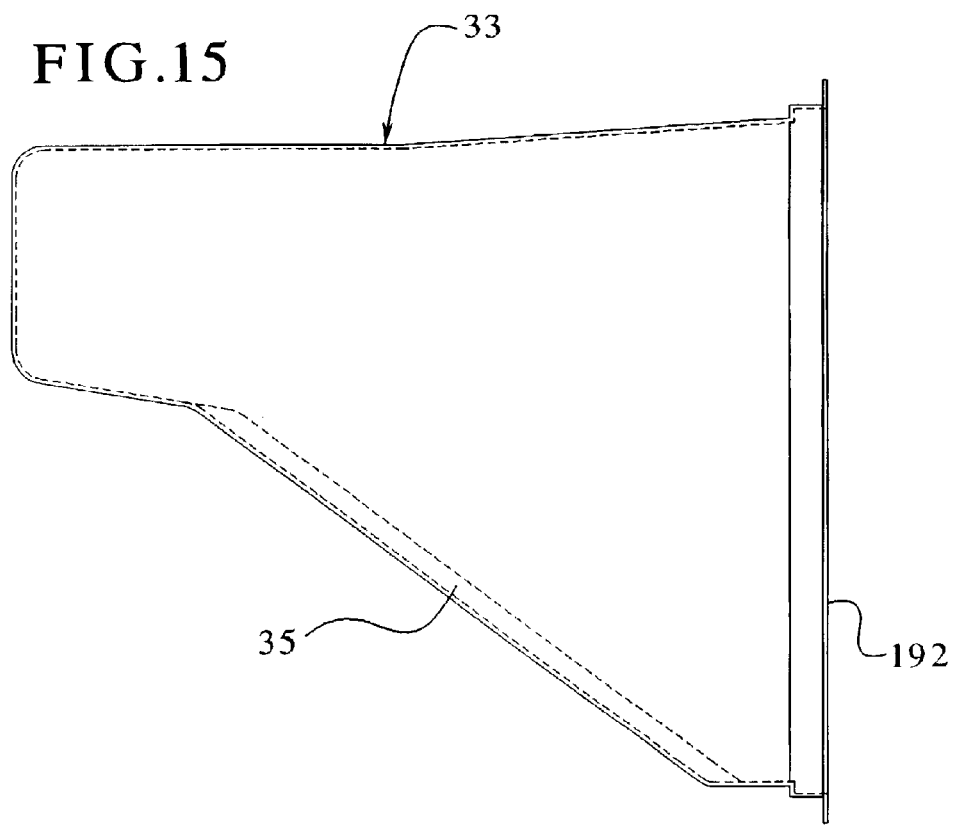
FIG. 15 is a side view of the container support of the wine or champagne preservation and dispensing apparatus of FIG. 1.
Figure 16:
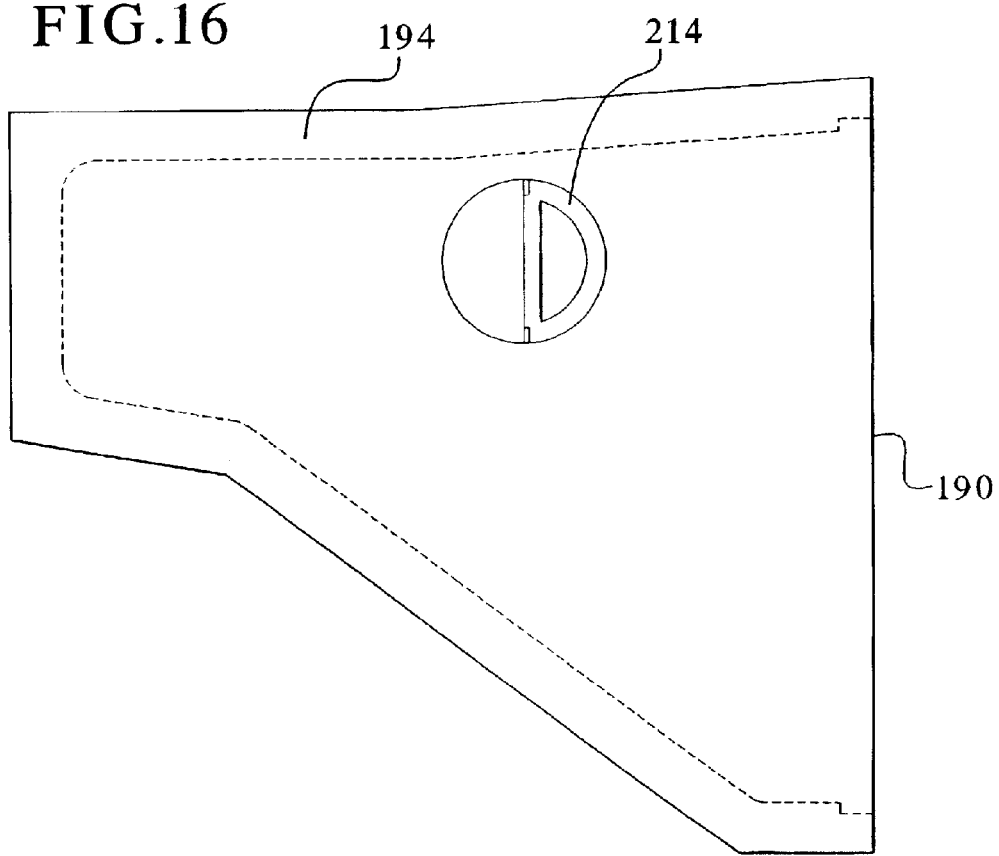
FIG. 16 is a side elevation view of an optional divider panel, adapted to be removably mounted in the container support, including insulation shown in phantom for maintaining the temperature in a divided area.
Figure 17:
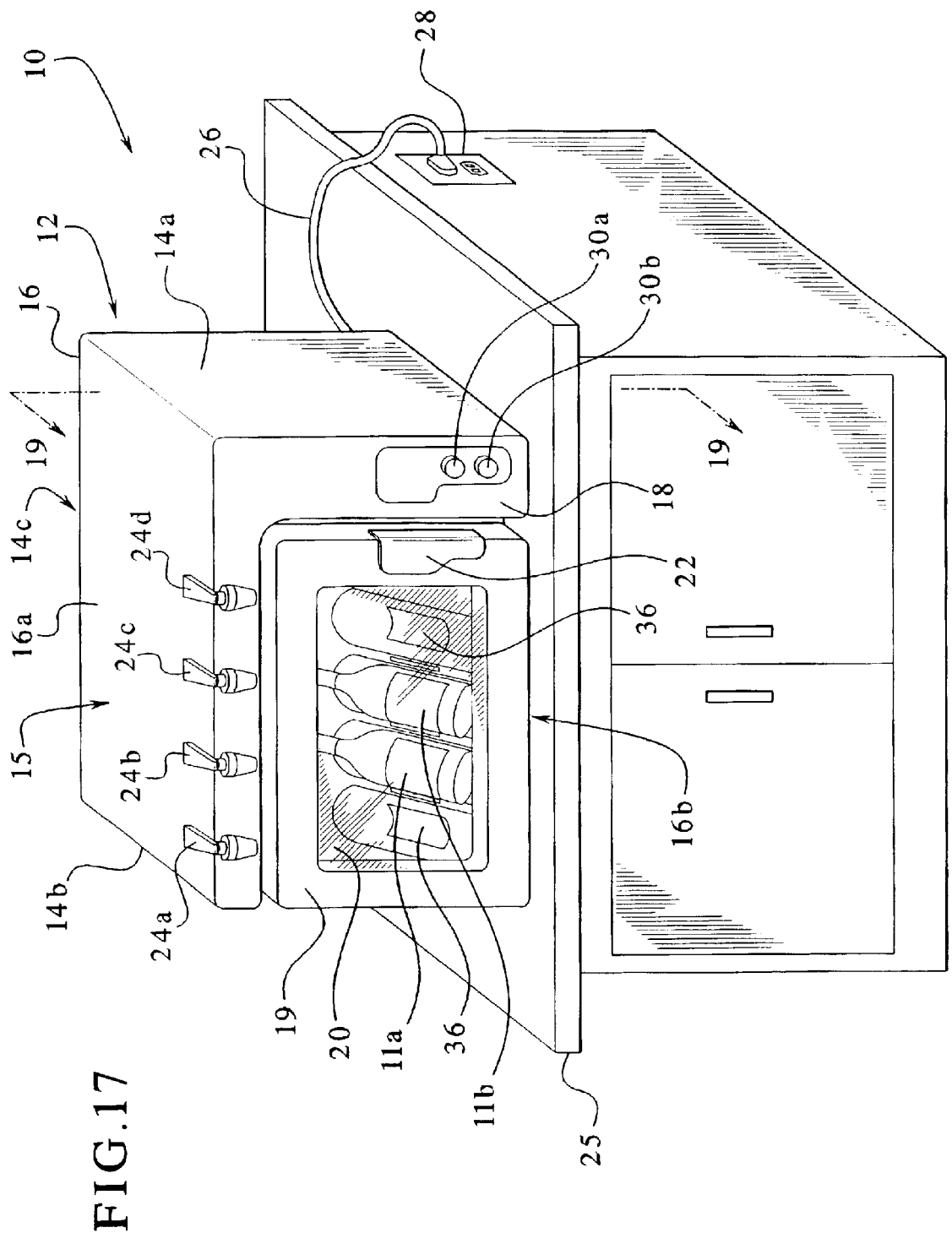
FIG. 17 is a front perspective view of the wine or champagne preservation and dispensing apparatus of one embodiment of the present invention with the door in closed position and showing the area or openings for the cooling system in the container support.
Figure 18:
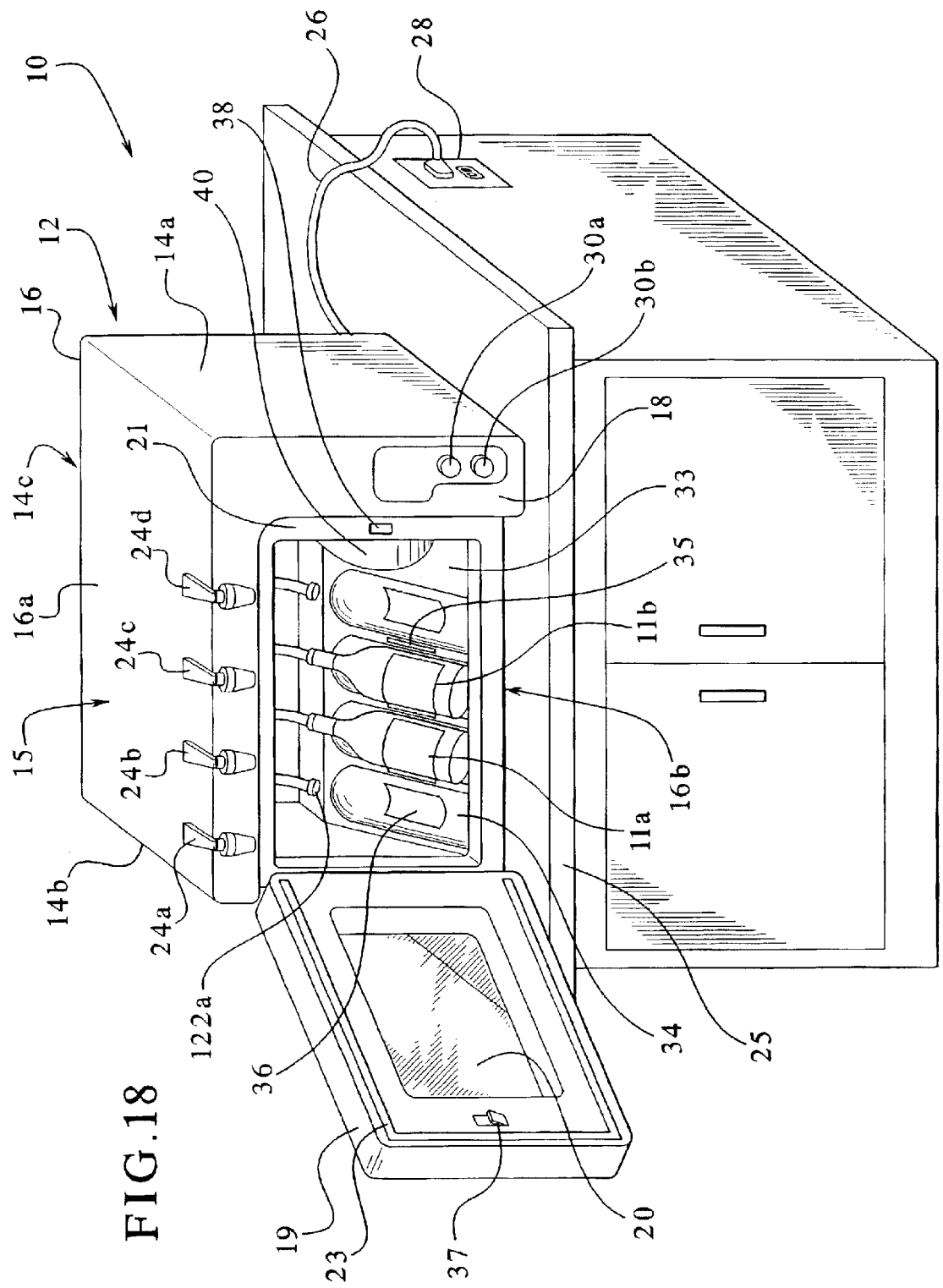
FIG. 18 is a front perspective view of the wine or champagne preservation and dispensing apparatus of FIG. 17 with the door in the open position and showing the area or openings for the cooling system in the container support.
Figure 19:
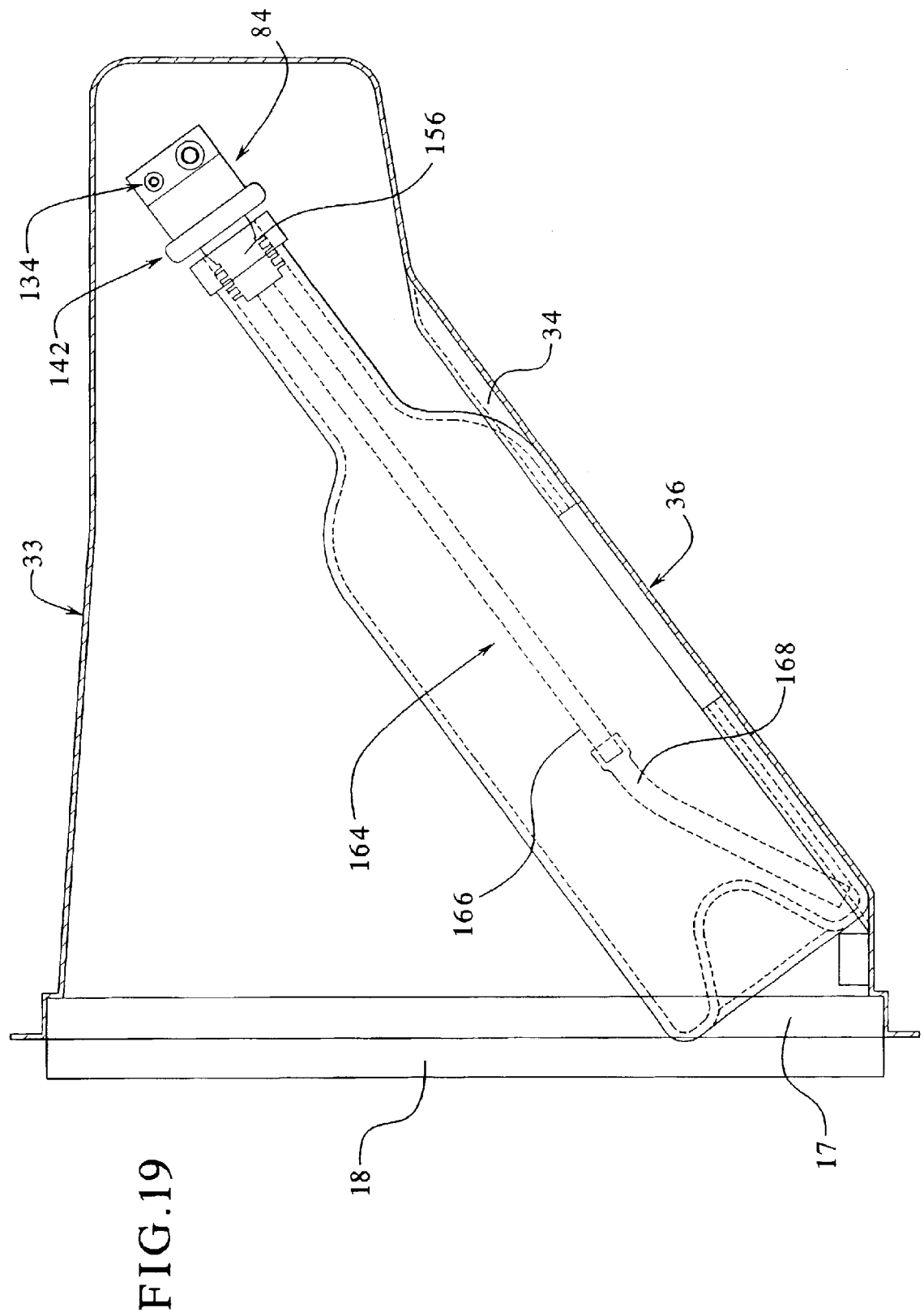
FIG. 19 is the cross-sectional view taken along a portion of line 19—19 of FIG. 17 illustrating a bottle positioned on the container support of the apparatus having an area or opening for the cooling system.
Figure 20:
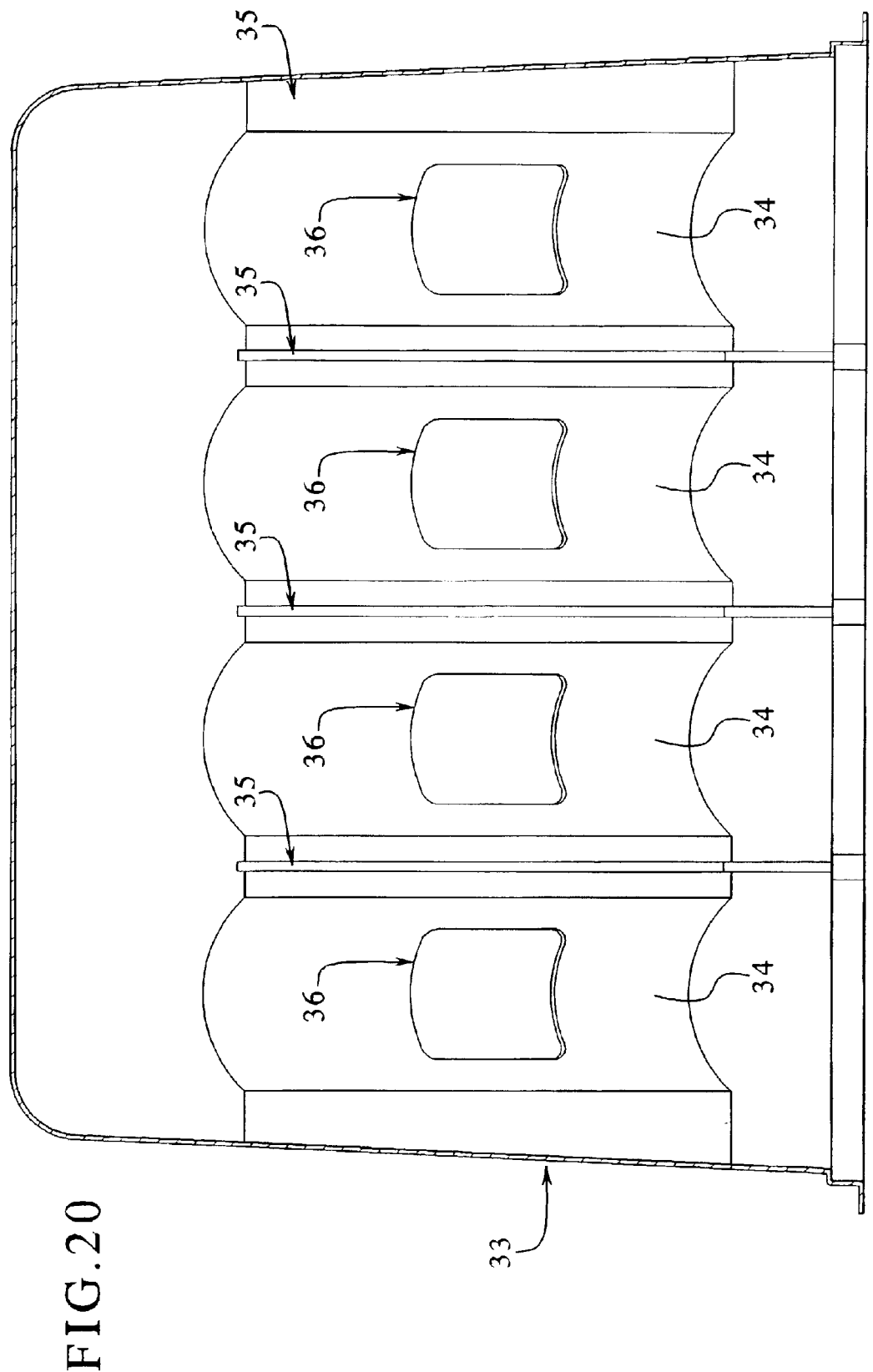
FIG. 20 is a front elevation view of the container support illustrating the areas or openings for the cooling system and the divider panel slots between each container receptacle in the container support.

Referring now to FIGS. 14 through 16, in one embodiment the apparatus 10 includes one or two optional divider panels 190 which are used with the cooling system 44 to enable a user to chill one or more bottles to a desired temperature and keep other bottles at room temperature. In some instances, a user will place a bottle of wine or champagne in the apparatus 10 where one or more bottles require a lower storage temperature than ambient temperature. In the apparatus 10, one, two, three or four bottles may be chilled as desired. If the user wants to chill every bottle in the apparatus then the user only needs to select the desired temperature for the bottles. The cooling system 44 will cool the entire interior chamber of the apparatus 10 until the desired temperature is achieved.

If less than four bottles are chilled in the apparatus 10, then a divider panel 190 is used to separate the bottles to be chilled from the bottles that are to remain at room temperature. The divider-panel 190 is placed inside the preservation and dispensing apparatus 10. Each divider panel 190 slides through the door opening in the bezel panel 18. The bottom slanted edge of each front panel 190 is fitted into a divider panel slot 35, which is disposed between each container or container receptacle 34. The divider panel 190 fits securely into the divider panel slot 35 to maintain the divider panel in place inside the apparatus 10. The divider panel 190 separates the container support into two or more sections (i.e., the divider panel 190 completely separates and seals selected bottles to a particular interior chamber area that is defined by the divider panel). In one embodiment, an air baffle 214 is formed in each divider panel 190 to allow cooled air to pass from one divided section to another to chill wine bottles to the same or different temperatures.

A divider panel 190 is placed between the container receptacles 34 to enclose a particular bottle or bottles between the divider panel 190 and the circulating fan 40 (shown in FIG. 2). Using one of the cooling system embodiments described above, the circulating fan 40 circulates air across the surface of the thermo-electric cooling plates 61 to cool the air. The cooled air is then circulated into the section or area defined by the divider panel, which includes the bottle or bottles to be chilled. The fan 40 supplies the cooled air to the divided area until a desired temperature is achieved. In this manner, a user can cool or chill some bottles and keep other bottles at ambient or room temperature within the same preservation and dispensing apparatus 10. If a user wants to chill one or more divided sections, the user simply opens the air baffle 214 to allow cool air to pass from one divided section to another.

The air baffle can be fully opened to allow the maximum amount of cooled air to pass through the baffle and completely chill a wine bottle to the maximum chill temperature. The air baffle can be partially opened to allow a medium amount of air to pass through the baffle, and therefore provide a medium or mid-level chill temperature. Also, the air baffle 214 can be fully closed to prevent cooled air from passing through the air baffle and keep the bottle at room temperature.

Referring now to FIG. 16, each divider panel 190 may include insulation 194 that attaches to the panel 190 in a suitable manner. The insulation enables the divider panels 190 to maintain a constant temperature in a particular area of the interior chamber of the housing 12. Also, the insulation minimizes leaking of cool air into another area or areas of the interior chamber. The insulation is preferably foam type insulation, however, it should be appreciated that any suitable type of insulation may be used on the divider panels 190.

The storage, preservation and dispensing apparatus 10 and the operation of this apparatus is equally suited for any types of wine or champagne. For wine, the pressure of the nitrogen rich gas is preferably approximately 5 psi. For champagne, the pressure of the nitrogen rich gas is preferably approximately 9 psi (to maintain the bubbly characteristic of champagne). Accordingly, the wine dispensing apparatus and the champagne dispensing apparatuses of the present invention are preferably two separate apparatuses, one for wine and one for champagne. However, it should be appreciated that a single unit adapted to provide different pressures for different bottles is contemplated by the present invention.

Figure 8:
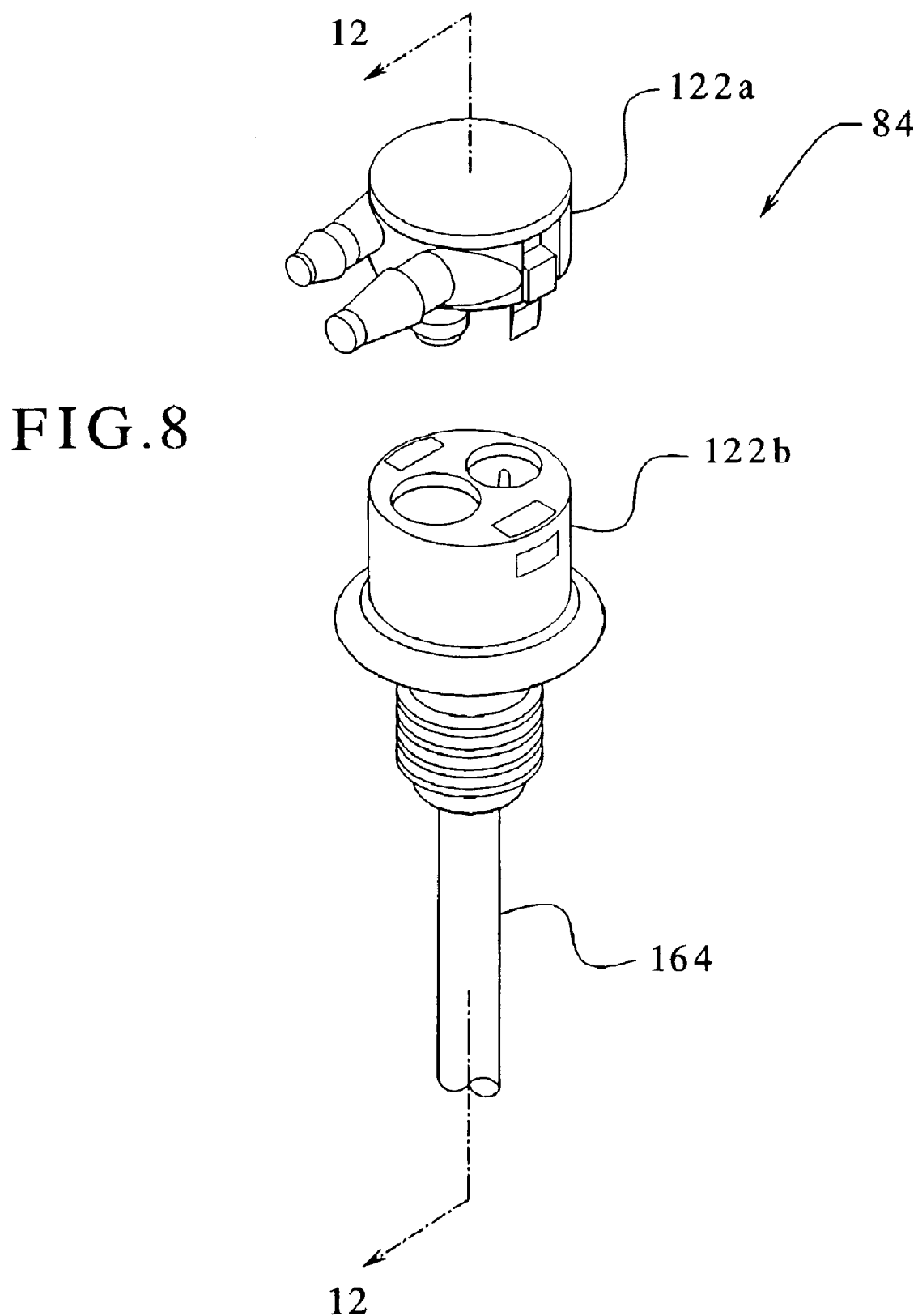
FIG. 8 is a partially exploded perspective view of one embodiment of a stopper of the wine or champagne preservation and dispensing apparatus of FIG. 1 showing the communication member separated from the sealing member.
Figure 22:
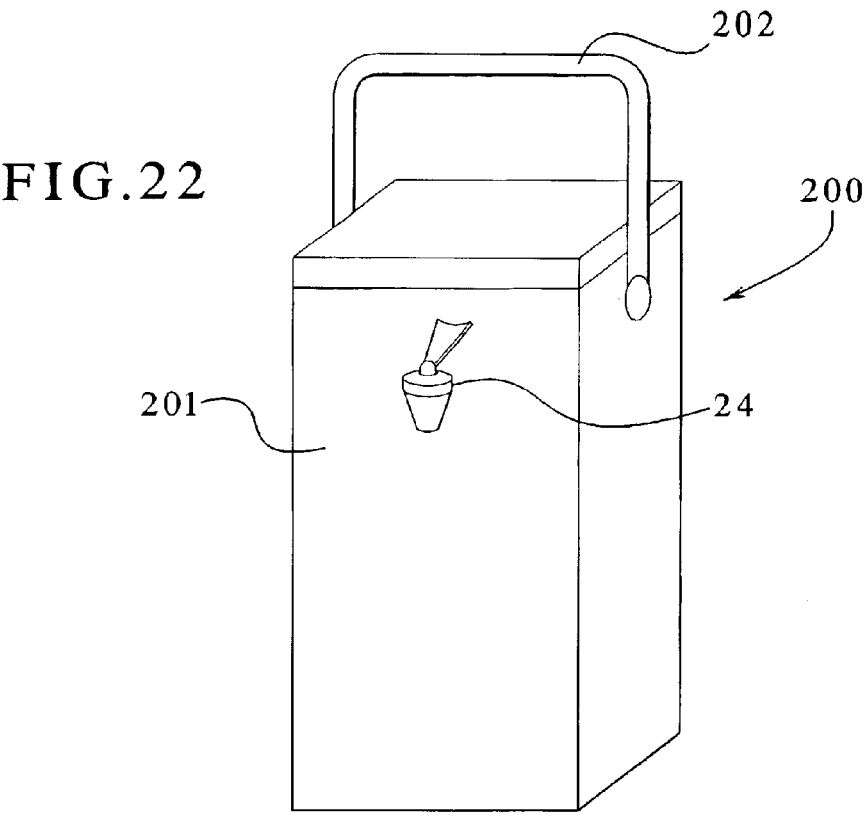
FIG. 22 is a front perspective view of one embodiment of the present invention illustrating the wine or champagne preservation and dispensing apparatus as a portable apparatus with a self-contained nitrogen generator and cooling system.
Figure 23:
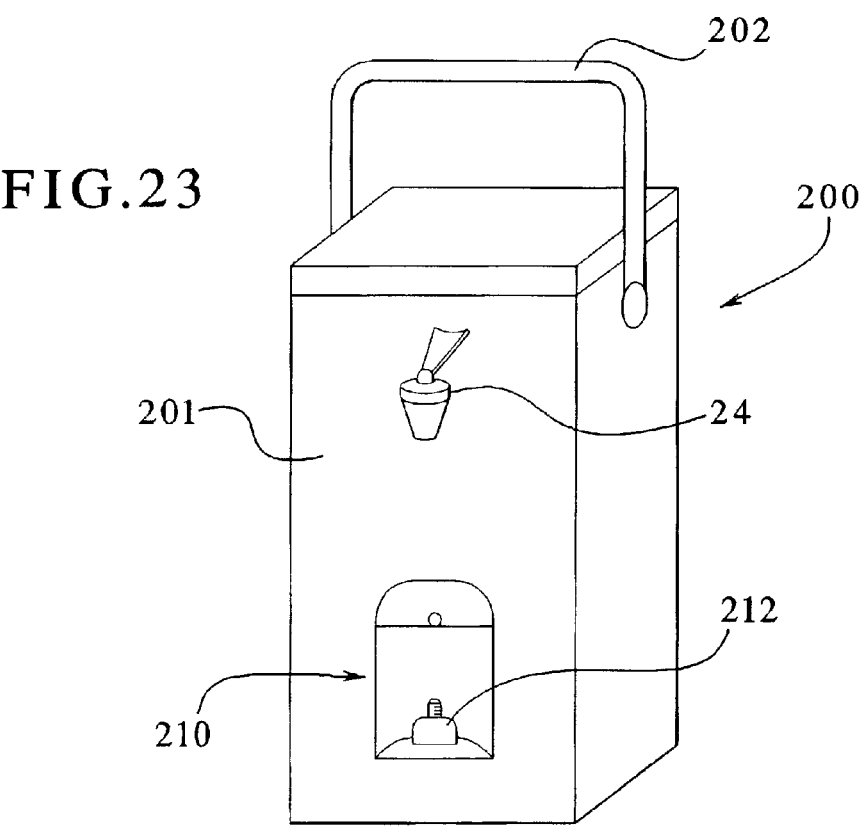
FIG. 23 is a front perspective view of one embodiment of the present invention illustrating the wine or champagne preservation and dispensing apparatus as a portable apparatus with a nitrogen cartridge attachment device.

Referring now to FIGS. 22 and 23, in another embodiment, a portable wine or champagne preservation and dispensing apparatus 200 is provided where the portable apparatus enables a user to transport wine or champagne to remote locations such as a park or picnic area. The portable apparatus 200 includes an insulated carrying pack 201 having a handle 202 for transporting one or more bottles of wine or champagne; a self-contained cooling system (not shown) mounted inside the pack for maintaining the bottles at a desired chill temperature; and a self-contained nitrogen generator (not shown) mounted inside the pack for generating nitrogen to preserve the wine or champagne in the pack. The stoppers 84 illustrated in FIG. 8, are interchangeable between the portable apparatus and the stationary apparatus described above so that a user may remove a bottle from the stationary apparatus 10 and transport it using the portable apparatus 200. Therefore, the wine or champagne does not degrade during transportation. The cooling system and the nitrogen generator operate similar to the cooling system 44 and the nitrogen generator 46 described above. The portable apparatus 200 may use several different types of power sources including a conventional electrical plug and outlet; an attachment for using the power sources in cars and other vehicles; a rechargeable battery; or any other suitable power source.

Referring now to FIG. 23, in a further embodiment of the present invention, the portable wine or champagne preservation and dispensing apparatus 200 includes an insulated carrying pack 201 with a handle or strap 202 for transporting one or two bottles of wine or champagne, a nitrogen cartridge (not shown) for generating nitrogen rich gas to preserve the contents of the bottle or bottles and one or more dispensers 24 for providing wine or champagne to a user. It should be appreciated that any suitable nitrogen cartridge may be used. The nitrogen cartridge is connected to the nitrogen connector 212 in the nitrogen receptacle 210. Stoppers 84 (illustrated in FIGS. 8 through 13) are used to seal the bottles, enable the nitrogen rich gas to enter the bottles through suitable tubing or a nitrogen communication line and enable the wine or champagne to move from a bottle to a dispenser. The stoppers 84 are interchangeable between the different types of apparatuses 10 and 200, as described above.

Referring now to FIGS. 24A and 24B, in a further embodiment, a single bottle may be preserved and dispensed using a single bottle dispensing apparatus 220. The single bottle apparatus 220 includes a frame 222. The frame 222 is preferably manufactured using a durable plastic material. It should be appreciated, however, that the frame may be manufactured with any suitable material. The frame 222 includes a bottle or container securing member, clamp or holder 224 which fits around the diameter of the bottle and holds the frame to the bottle; a refillable nitrogen cartridge or storage container 226, for storing nitrogen to preserve wine or champagne in a bottle; a dispenser 230, for pouring the wine or champagne into a user's glass; and a stopper 84 for supplying the nitrogen to the bottle and transporting the wine or champagne from the bottle to the dispenser. A nitrogen release valve or pressure reducing valve 228 is located between the nitrogen storage container 226 and the stopper 84 to provide nitrogen from the nitrogen storage container to a bottle, or in another embodiment to a nitrogen fill port. A nitrogen fill port 232 is located at the bottom of the nitrogen storage container 226. A nitrogen cartridge or nitrogen dispenser is adapted to be connected to the nitrogen fill port 232 to fill the refillable nitrogen cartridge or storage container 226.

In operation, a user tilts the frame 221 and attached a bottle as if to pour the wine or champagne from the bottle into a glass. As the user tilts the bottle, the user presses the nitrogen release valve 228 and provides a gentle flow of nitrogen (approximately 4 psi or less) from the nitrogen storage container 226 into the bottle. An amount of wine or champagne equal to the amount of nitrogen supplied to the bottle is dispensed from the dispenser 230. When a user stops dispensing the wine or champagne from the bottle, the user releases the valve 228. The nitrogen supplied to the bottle remains in the bottle to preserve the wine or champagne.

Figure 25:
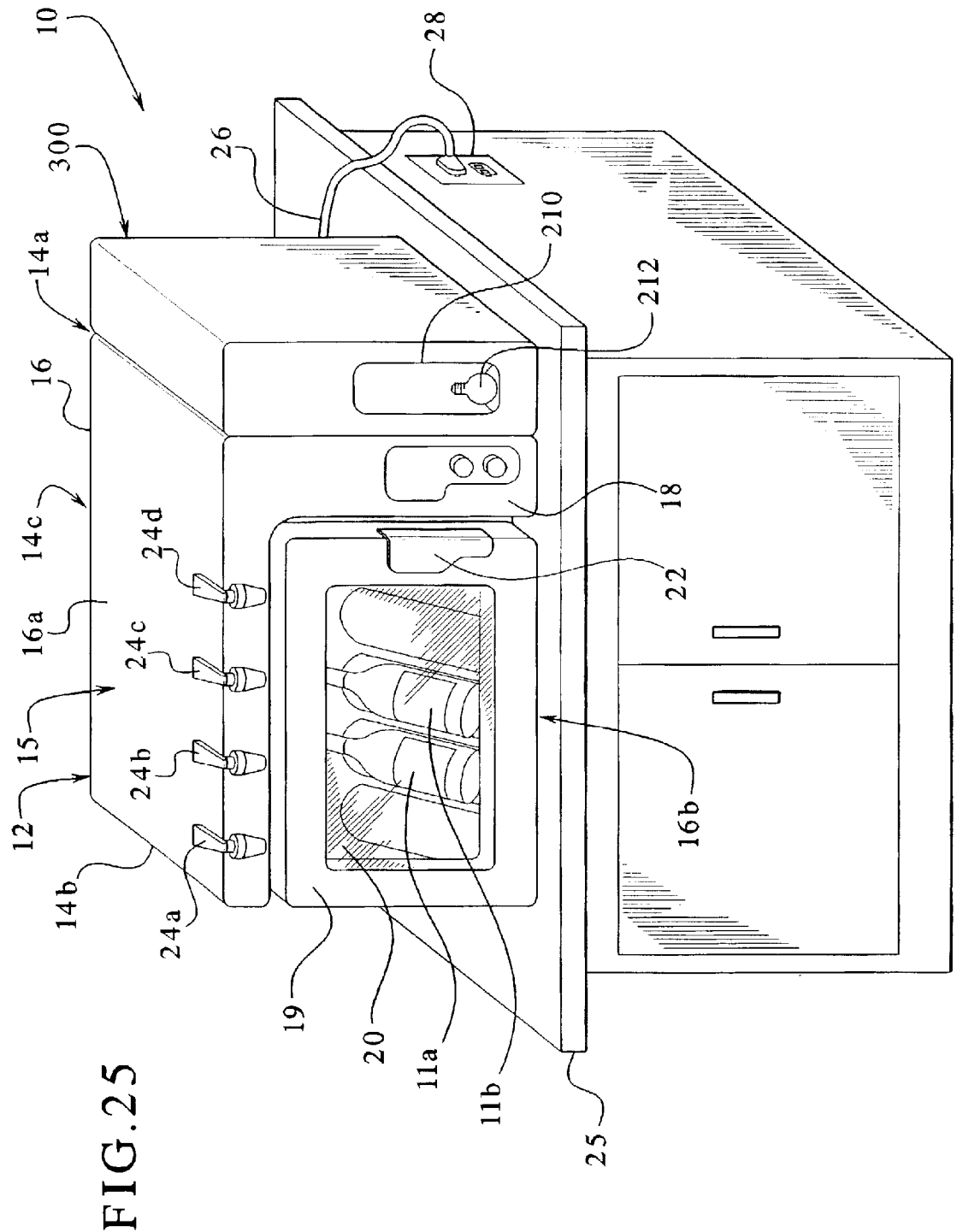
FIG. 25 is a front perspective view of the wine or champagne preservation and dispensing apparatus of one embodiment of the present invention where and optional nitrogen dispenser is connected to the apparatus.

Referring now to FIG. 25, in another embodiment, a nitrogen dispenser 300 is included as a component of the stationary wine or champagne preservation and dispensing apparatus 10. The nitrogen dispenser 300 is preferably mounted on the side of the apparatus 10 and connected to the nitrogen generator 46 (as illustrated in FIG. 5) with suitable tubing or nitrogen communication lines. The nitrogen dispenser 300 provides nitrogen rich gas from the nitrogen generator 46 and enables a user to fill or re-fill the portable nitrogen cartridges (not shown) as described above, which are used in the portable apparatus 200 (illustrated in FIG. 23). In another embodiment, the nitrogen dispenser 300 is a separate nitrogen generating unit that is manufactured and sold separately from the stationary and portable apparatuses. The nitrogen generating unit is portable or can be connected to the stationary apparatus 10 as shown in FIG. 25 or transported with the portable wine or champagne preservation and dispensing apparatuses for re-filling the nitrogen cartridges at remote locations. Similar to the portable apparatuses 200 and 220, the separate nitrogen generating unit can be powered using several different types of power sources as described above.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A wine or champagne preservation and dispensing apparatus comprising:
   an enclosed housing adapted to receive a plurality of wine or champagne containers;
   a plurality of stoppers, each stopper including a fluid communication member removably attachable to a sealing member, said sealing member adapted to sealingly engage an opening in one of the containers;
   a plurality of dispensers connected to the housing;
   a plurality of liquid communication lines, each said liquid communication line connected to one of the dispensers and adapted to be fluidly connected to one of the stoppers;
   an automatic nitrogen generator connected to said housing which draws in ambient air through the housing and generates nitrogen rich gas, said nitrogen generator including a manifold having a plurality of outlets; and
   a plurality of nitrogen communication lines, each said nitrogen communication line connected to one of said outlets on the manifold and adapted to be fluidly connected to one of the stoppers to direct the generated nitrogen rich gas into said container sealed by said stopper to preserve wine or champagne in said container.

2. The apparatus of claim 1, which includes a container support mounted in said housing which includes a plurality of container receptacles for receiving the containers of wine or champagne.

3. The apparatus of claim 2, which includes a cooling member mounted in the housing adjacent to the container support.

4. The apparatus of claim 1, wherein the nitrogen generator includes a nitrogen storage tank for temporarily storing the nitrogen rich gas generated by the automatic nitrogen generator.

5. The apparatus of claim 1, wherein the nitrogen generator includes a pressure retaining valve which opens at a preset pressure.

6. The apparatus of claim 5, wherein the preset pressure is approximately 110 psig.

7. The apparatus of claim 1, wherein the nitrogen generator includes a pressure reducer fluidly connected to the nitrogen communication lines which reduces the pressure of the nitrogen rich gas directed to the containers to a preset pressure.

8. The apparatus of claim 7, wherein said preset pressure is approximately 2 psig to approximately 10 psig.

9. The apparatus of claim 1, wherein the nitrogen generator includes a carbon molecular sieve which adsorbs oxygen from the ambient air to generate the nitrogen rich gas.

10. The apparatus of claim 1, wherein the nitrogen generator includes a pressure controller which activates the air compressor at a first defined pressure and deactivates the air compressor at a second defined pressure.

11. The apparatus of claim 10, wherein the first defined pressure is approximately less then one-half of the second defined pressure.

12. The apparatus of claim 1, wherein the nitrogen generator includes a port for filling a removable nigtron canister.

13. The apparatus of claim 1, wherein the nitrogen generator includes a pressure retaining valve fluidly connected to the carbon molecular sieve which opens at preset pressure, a pressure controller connected to the air compressor for activating and deactivating the air compressor based on defined pressure limits, a nitrogen storage tank for storing generated nitrogen rich gas, and a pressure reducer for reducing the pressure of the nitrogen rich gas exiting the nitrogen storage tank.

14. A wine or champagne preservation and dispensing apparatus comprising:
   an enclosed housing adapted to hold at least one container of wine or champagne;
   at least one dispenser attached to the housing;
   at least one liquid communication line connected to the dispenser and adapted to be fluidly connected to the container;
   an automatic nitrogen generator attached to the housing which draws in ambient air through the housing to generate a nitrogen rich gas;

a cooling unit including a circulating fan attached to the housing which generates and distributes cool air into the housing to cool the container in the housing; and at least one nitrogen communication line connected to the nitrogen generator and adapted to be fluidly connected to the container to direct the generated nitrogen rich gas to said container to preserve wine or champagne in the container.

15. A portable wine or champagne preservation and dispensing apparatus which is adapted to function in conjunction with a second wine or champagne preservation and dispensing apparatus, said portable apparatus comprising:

a portable frame;

at least one container securing member attached to said frame for securely and removably holding a wine or champagne container adjacent to the frame;

at least one dispenser attached to the frame;

at least one liquid communication line connected to the dispenser;

a nitrogen storage tank receiving port attached to the frame for receiving a nitrogen storage tank which is adapted to be filled by a nitrogen generator in the second wine or champagne preservation and dispensing apparatus;

at least one nitrogen communication line connected to the nitrogen storage tank receiving port; and a stopper adapted to sealingly engage an opening in the wine or champagne container, said stopper including a first port adapted to receive the nitrogen communication line to direct nitrogen rich gas from the nitrogen storage tank receiving port into the wine or champagne container to preserve wine or champagne in the container, and a second port adapted to receive the liquid communication line to direct wine or champagne from the container to the dispenser when the dispenser is activated.

* * * * *